(12) United States Patent
Tabata et al.

(10) Patent No.: US 8,795,132 B2
(45) Date of Patent: Aug. 5, 2014

(54) CONTROL DEVICE FOR VEHICLE DRIVE DEVICE

(75) Inventors: Atsushi Tabata, Okazaki (JP); Tatsuya Imamura, Okazaki (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 14/129,450

(22) PCT Filed: Jun. 28, 2011

(86) PCT No.: PCT/JP2011/064844
§ 371 (c)(1),
(2), (4) Date: Dec. 26, 2013

(87) PCT Pub. No.: WO2013/001616
PCT Pub. Date: Jan. 3, 2013

(65) Prior Publication Data
US 2014/0128217 A1 May 8, 2014

(51) Int. Cl.
*B60W 10/02* (2006.01)
*B60W 10/06* (2006.01)
*B60W 10/08* (2006.01)

(52) U.S. Cl.
USPC .................................................. 477/5

(58) Field of Classification Search
CPC .... B60W 10/023; B60W 10/06; B60W 10/08
USPC ........................................... 477/5, 54
See application file for complete search history.

(56) References Cited

U.S. PATENT DOCUMENTS

| | | | |
|---|---|---|---|
| 7,195,581 B2 * | 3/2007 | Segawa et al. | 477/180 |
| 7,670,253 B2 * | 3/2010 | Sah | 477/3 |
| 2010/0248893 A1 * | 9/2010 | Shimanaka | 477/5 |
| 2011/0005215 A1 | 1/2011 | Ota et al. | |
| 2013/0245875 A1 | 9/2013 | Imamura et al. | |

FOREIGN PATENT DOCUMENTS

| | | |
|---|---|---|
| JP | 2007-191049 A | 8/2007 |
| JP | 2007-269256 A | 10/2007 |

(Continued)

*Primary Examiner* — Edwin A Young
(74) *Attorney, Agent, or Firm* — Kenyon & Kenyon LLP

(57) ABSTRACT

A control device of a vehicle drive device comprises a hydraulic power transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels, the vehicle drive device further comprising an electric path through which power is electrically transmitted by giving/receiving electric power between the first electric motor and the second electric motor and a mechanical path through which power is mechanically transmitted via the hydraulic power transmission device, the control device of the vehicle drive device being configured to control an operating point of the engine by adjusting a torque of the first electric motor, the control device being configured to adjust the torque of the first electric motor such that a sum of an engine torque and the torque of the first electric motor is balanced with an input-side load torque generated in the input-side rotating element depending on a speed ratio of the hydraulic power transmission device when the operating point of the engine is controlled, the control device being configured to calculate the input-side load torque based on engine rotation speed indicated by the target engine operating point and determine the torque of the first electric motor based on the engine torque indicated by the target engine operating point and the input-side load torque, the vehicle drive device further comprising a capacity variable device varying a characteristic of a capacity coefficient of the hydraulic power transmission device relative to a speed ratio of the hydraulic power transmission device that is a hydraulic characteristic of the hydraulic power transmission device for determining the input-side load torque.

7 Claims, 13 Drawing Sheets

(56) References Cited

FOREIGN PATENT DOCUMENTS

| | | |
|---|---|---|
| JP | 2008-184009 A | 8/2008 |
| JP | 4277856 B2 | 6/2009 |
| JP | 2009-220618 A | 10/2009 |
| JP | 2010-111317 A | 5/2010 |
| JP | 2010-137711 A | 6/2010 |
| JP | 2010-215190 A | 9/2010 |
| WO | 2012/070156 A1 | 5/2012 |

* cited by examiner

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev1 |  |  | ○ |  |  | ○ |
| Rev2 |  |  |  | ○ |  | ○ |

CONTROL DEVICE FOR VEHICLE DRIVE DEVICE

CROSS-REFERENCE TO RELATED APPLICATIONS

This is a national phase application based on the PCT International Patent Application No. PCT/JP2011/064844 filed on Jun. 28, 2011, the entire contents of which are incorporated herein by reference.

TECHNICAL FIELD

The present invention relates to a control device of a vehicle drive device including an engine, an electric motor, and a hydraulic power transmission device such that power of the engine can be transmitted through a plurality of transmission paths.

BACKGROUND ART

A vehicle drive device is well known that includes a hydraulic power transmission device having an input-side rotating element to which power from an engine is input and an output-side rotating element outputting power to drive wheels. For example, this corresponds to a vehicle drive device described in Patent Document 1. Such a vehicle drive device has an engine rotation speed (corresponding to a rotation speed of the input-side rotating element of the hydraulic power transmission device) passively determined depending on a vehicle speed (corresponding to a rotation speed of the output-side rotating element of the hydraulic power transmission device), a hydraulic characteristic of the hydraulic power transmission device, and an engine output. Power transmission efficiency is also passively determined in a mechanical path hydraulically transmitting the engine output through the hydraulic power transmission device.

PRIOR ART DOCUMENT

Patent Document

Patent Document 1: Japanese Laid-Open Patent Publication No. 2009-220618

SUMMARY OF THE INVENTION

Problem to Be Solved by the Invention

Considering improvement in fuel efficiency of a vehicle, for example, it is desirable to drive an engine at an operating point of an engine (referred to as an engine operating point) reducing a fuel consumption rate as low as possible. It is also desirable to improve power transmission efficiency when power is transmitted from the engine. In this regard, in a vehicle drive device having a first electric motor disposed such that power can be transmitted to an input-side rotating element of a hydraulic power transmission device and a second electric motor disposed such that power can be transmitted to drive wheels, it is conceivable that the first electric motor arbitrarily controls the engine operating point. In such a case, a transmission path transmitting the engine output to the drive wheel side is implemented by using both a mechanical path via the hydraulic power transmission device and an electric path through electric power transmission between the first electric motor and the second electric motor. However, even if the engine operating point can arbitrarily be controlled, the hydraulic characteristic of the hydraulic power transmission device is uniquely determined by a hardware configuration of the input-side rotating element etc. Therefore, at the engine operating point during this control, the torque transmitted to the mechanical path side (e.g., torque generated in the input-side rotating element) is uniquely determined by the hydraulic characteristic of the hydraulic power transmission device, and the torque transmitted to the electric path side (e.g., torque of the first electric motor) is consequently uniquely determined. As a result, at the engine operating point during this control, a path with better transmission efficiency may not sufficiently be used. For example, although power transmission efficiency during transmission of power from the engine may be improved by increasing a proportion of power transmission through the path with better transmission efficiency, this may not be possible. The problem as described above is not known and no proposal has been made for achieving fuel efficiency improvement of a vehicle by increasing a proportion of power transmission through the path with better transmission efficiency in a vehicle drive device capable of controlling the engine operating point with the first electric motor.

The present invention was conceived in view of the situations and it is therefore an object of the present invention to provide a control device of a vehicle drive device capable of achieving further fuel efficiency improvement of a vehicle when an engine operating point is controlled by adjusting a torque of an electric motor.

Means for Solving the Problem

To achieve the object, the first aspect of the invention provides (a) a control device of a vehicle drive device including a hydraulic power transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels, (b) the vehicle drive device further including an electric path through which power is electrically transmitted by giving/receiving electric power between the first electric motor and the second electric motor and a mechanical path through which power is mechanically transmitted via the hydraulic power transmission device, the control device of a vehicle drive device being configured to control an operating point of the engine by adjusting a torque of the first electric motor, (c) the vehicle drive device further including a capacity variable device varying a capacity of the hydraulic power transmission device.

Effects of the Invention

Consequently, since the control device of a vehicle drive device has an electric path through which power is electrically transmitted by giving/receiving electric power between the first electric motor and the second electric motor and a mechanical path through which power is mechanically transmitted via the hydraulic power transmission device, and the control device of a vehicle drive device can control an operating point of the engine without being constrained by a rotation speed of the output-side rotating element by adjusting a torque of the first electric motor, for example, the engine can be driven at the optimal operating point for the fuel efficiency improvement and the fuel efficiency improvement of the vehicle can be achieved. Additionally, since the vehicle drive device further includes the capacity variable device varying the capacity of the hydraulic power transmission device, a change can be made to the torque generated in the input-side rotating element uniquely determined based on the capacity of the hydraulic power transmission device at the operating point of the engine arbitrarily controlled by adjusting the first electric motor torque. Therefore, at the operating point of the engine in this case, a proportion between the torque transmitted to the mechanical path side and the torque transmitted to the electric path side can be changed to increase a proportion of the power transmission through the path with a better transmission rate out of the mechanical path and the electric path. Therefore, when the engine operating point is controlled by adjusting the first electric motor torque, further fuel efficiency improvement of the vehicle can be achieved.

The second aspect of the invention provides the control device of a vehicle drive device recited in the first aspect of the invention, wherein when the operating point of the engine is controlled to the same target operating point, if power transmission efficiency is improved at the time of transmission of power from the engine through the electric path and the mechanical path, the capacity variable device changes the capacity of the hydraulic power transmission device. Consequently, when the engine operating point is controlled by adjusting the torque of the electric motor, further fuel efficiency improvement of the vehicle can properly be achieved.

The third aspect of the invention provides the control device of a vehicle drive device recited in the first or second aspect of the invention, wherein if a requested load is equal to or less than a predetermined value set in advance such that the requested load is supportable by power transmission through the electric path in a range in which the requested load is equal to or less than the predetermined value, the capacity variable device is allowed to make a change toward a smaller capacity of the hydraulic power transmission device. Consequently, if the requested load is greater than the predetermined value, this avoids the possibility of reducing the torque generated in the input-side rotating element and increasing the first electric motor torque due to the change toward smaller capacity of the hydraulic power transmission device and thus causing the state in which the increased torque cannot be output by the rated output of the first electric motor.

The fourth aspect of the invention provides the control device of a vehicle drive device recited in any one of the first to third aspects of the invention, wherein if the transmission efficiency through the electric path is better than a transmission efficiency through the mechanical path, the capacity variable device decreases the capacity of the hydraulic power transmission device. Consequently, the torque generated in the input-side rotating element can be reduced to increase the first electric motor torque, thereby increasing the proportion of power transmission through the electric path with the better transmission efficiency. Therefore, when the engine operating point is controlled by adjusting the first electric motor torque, further fuel efficiency improvement of the vehicle can be achieved.

The fifth aspect of the invention provides the control device of a vehicle drive device recited in any one of the first to fourth aspects of the invention, wherein if the transmission efficiency through the mechanical path is better than a transmission efficiency through the electric path, the capacity variable device increases the capacity of the hydraulic power transmission device. Consequently, the torque generated in the input-side rotating element can be increased to reduce the first electric motor torque, thereby increasing the proportion of power transmission through the mechanical path with the better transmission efficiency. Therefore, when the engine operating point is controlled by adjusting the first electric motor torque, further fuel efficiency improvement of the vehicle can be achieved.

The sixth aspect of the invention provides the control device of a vehicle drive device recited in any one of the first to fifth aspects of the invention, wherein the torque of the first electric motor is adjusted such that a sum of an engine torque and the torque of the first electric motor is balanced with an input-side load torque generated in the input-side rotating element depending on a speed ratio of the hydraulic power transmission device. Consequently, the first electric motor torque can easily be adjusted based on the hydraulic characteristics of the hydraulic power transmission device.

The seventh aspect of the invention provides the control device of a vehicle drive device recited in any one of the first to sixth aspects of the invention, wherein the operating point of the engine is controlled by adjusting the torque of the first electric motor such that the operating point of the engine is located along a predetermined operation curve of the engine and that a target value of engine output is achieved. Consequently, the engine is operated at an engine operating point increasing engine efficiency as high as possible, i.e., an engine operating point reducing a fuel consumption rate as low as possible.

The eighth aspect of the invention provides the control device of a vehicle drive device recited in any one of the first to seventh aspects of the invention, wherein the operating point of the engine is shifted to a side of greater total efficiency represented by a product of a power transmission efficiency when power from the engine is transmitted through the electric path and the mechanical path and an engine efficiency at the operating point of the engine. Consequently, as compared to the case that the operating point of the engine is not changed depending on the total efficiency, the efficiency of the vehicle drive device is increased as a whole and the vehicle fuel efficiency can be improved.

MODE FOR CARRYING OUT THE INVENTION

In the present invention, preferably, the hydraulic power transmission device is a torque converter having a stator impeller rotatably disposed between a pump impeller acting as the input-side rotating element and a turbine impeller acting as the output-side rotating element. The capacity variable device is a device varying a capacity of the torque converter by controlling the rotating operation of the stator impeller or discharging a portion of a fluid flow generated by rotationally driving the pump impeller to the outside of the turbine impeller through an opening/closing mechanism disposed on the turbine impeller.

Preferably, fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole.

Preferably, the operating point of the engine is an operating point indicative of an operating state of the engine represented by rotation speed and output torque of the engine etc. In other words, the operating point of the engine refers to an operating state of the engine indicated by one point in two-dimensional coordinates of an axis indicative of rotation speed of the engine and an axis indicative of output torque of the engine.

Preferably, the vehicle drive device includes an electric storage device connected to each of the first electric motor and the second electric motor such that electric power can be given/received and the second electric motor is supplied with a remaining portion of the electric power generated by the first electric motor after subtracting electric power to be stored into the electric storage device, so as to drive the second electric motor.

Preferably, adjusting the torque of the first electric motor means adjusting power (electric power) transmitted through the electric path, or in other words, adjusting a power transmission rate of the electric path or the mechanical path. Therefore, the operating point of the engine is controlled by adjusting the power transmitted through the electric path.

Preferably, the electric path is a power transmission path through which power is electrically transmitted by supplying all or a portion of the electric power generated by the first electric motor to the second electric motor.

An example of the present invention will now be described in detail with reference to the drawings.

EXAMPLE

Figures 1, 2:
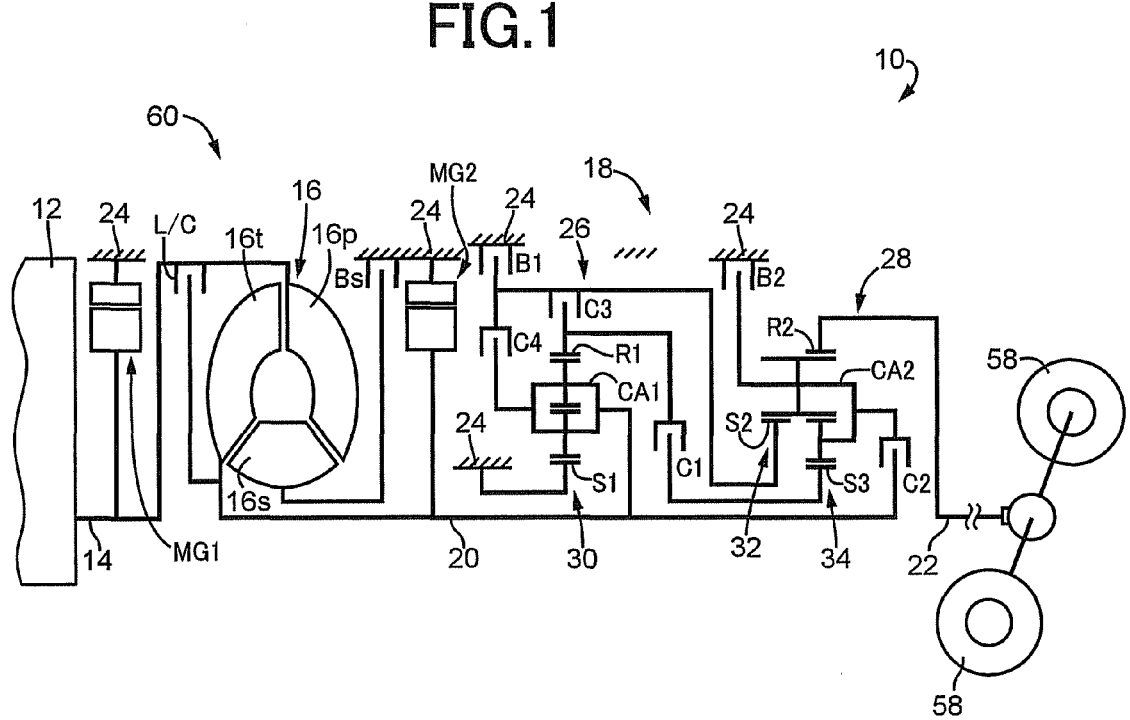
FIG. 1 is a schematic for explaining a configuration of a vehicle drive device of an example of the present invention.
FIG. 2 is an operation table of hydraulic friction engagement devices for establishing shift stages in the automatic transmission depicted in FIG. 1.

FIG. 1 is a schematic for explaining a configuration of a vehicle drive device 10 of an example of the present invention. In FIG. 1, the vehicle drive device 10 is preferably employed in FR (front-engine rear-drive) type vehicles and includes an engine 12 made up of an internal-combustion engine, a torque converter (hydraulic power transmission device) 16 coupled to a crankshaft 14 of the engine 12, an automatic transmission 18 disposed between the torque converter 16 and drive wheels 58 and coupled to the output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18. The torque converter 16, the automatic transmission 18, the first electric motor MG1, the second electric motor MG2, etc., are configured symmetrically relative to the common axial center thereof and the lower halves thereof from the axial center are not depicted in FIG. 1.

The torque converter 16 includes a pump impeller 16p acting as an input-side rotating element to which power from the engine 12 is input, a turbine impeller 16t acting as an output-side rotating element outputting power to the drive wheels 58, and a stator impeller 16s rotatably disposed between the pump impeller 16p and the turbine impeller 16t and is a hydraulic power transmission device transmitting power through operating oil. The pump impeller 16p, i.e., a pump impeller, is coupled to the crankshaft 14 of the engine 12 and the first electric motor MG1 and is rotationally driven by the engine 12 to generate a fluid flow due to a flow of the operating oil in the torque converter 16. The turbine impeller 16t, i.e., a turbine runner, is coupled to the input shaft 20 of the automatic transmission 18 and rotated in response to the fluid flow from the pump impeller 16p. The stator impeller 16s is disposed in the fluid flow from the pump impeller 16p to the turbine impeller 16t and coupled via a brake Bs to a transmission case 24 acting as a non-rotating member in a disconnectable manner. The brake Bs is a hydraulic friction engagement device including a hydraulic cylinder and a multi-plate brake frictionally engaged depending on an oil pressure supplied to the hydraulic cylinder. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16p are coupled in series in this example, a rotation speed Np of the pump impeller 16p (hereinafter referred to as a pump rotation speed Np) is the same as a rotation speed $N_{MG1}$ of the first electric motor MG1 (hereinafter referred to as a first electric motor rotation speed $N_{MG1}$) and an engine rotation speed Ne. Since the turbine impeller 16t, the second electric motor MG2, and the input shaft 20 of the automatic transmission 18 are coupled in series, a rotation speed Nt of the turbine impeller 16t (hereinafter referred to as a turbine rotation speed Nt) is the same as a rotation speed $N_{MG2}$ of the second electric motor MG2 (hereinafter referred to as a second electric motor rotation speed $N_{MG2}$) and a rotation speed $N_{ATIN}$ of the input shaft 20.

The torque converter 16 includes a lockup clutch L/C capable of direct coupling between the pump impeller 16p and the turbine impeller 16t. The lockup clutch L/C is controlled to be in one of a completely engaged state, a slipping state, and a released state. When the lockup clutch L/C is in the released state, the torque is transmitted between the crankshaft 14 and the input shaft 20 via the operating oil in the torque converter 16 as described above. When the lockup clutch L/C is in the completely engaged state, the crankshaft 14 of the engine 12 and the input shaft 20 of the automatic transmission 18 are integrally coupled to each other and the torque is directly transmitted between the crankshaft 14 and the input shaft 20 without the intervention of the operating oil in the torque converter 16.

The first electric motor MG1 is coupled to the crankshaft 14 of the engine 12 in series via a damper etc., absorbing pulsation, for example, and is directly coupled to the pump impeller 16p of the torque converter 16. The second electric motor MG2 is coupled to the drive wheels 58 indirectly via the automatic transmission 18 etc. The first electric motor MG1 and the second electric motor MG2 are rotators configured to selectively acquire a function as an electric motor generating a drive torque and a function as an electric generator generating a regenerative torque and are made up of AC synchronous motor generators, for example. An electric storage device 36 acting as a battery and an inverter 38 for controlling the electric motors MG1 and MG2 are disposed in the vehicle drive device 10 (see FIG. 3), and the electric storage device 36, the first electric motor MG1, and the second electric motor MG2 are connected such that electric power can mutually be given/received. The first electric motor MG1 and the second electric motor MG2 can apply a drive torque in the positive rotation direction to the crankshaft 14 and the input shaft 20 through the drive thereof and can apply a load torque, i.e., a braking torque, in the negative rotation direction to the crankshaft 14 and the input shaft 20 through the electric generation (regeneration) thereof while charging the electric storage device 36 disposed in a vehicle via the inverter 38. The positive rotation direction of the crankshaft 14 and the input shaft 20 is the rotation direction of the crankshaft 14 while the engine 12 is driven and the negative rotation direction is the rotation direction opposite to the positive rotation direction.

The automatic transmission 18 is interposed between the torque converter 16 and the drive wheels 58 and is a known planetary-gear type multistage transmission including a first transmission portion 26 mainly made up of a first planetary gear device 30 and a second transmission portion 28 mainly made up of a second planetary gear device 32 and a third planetary gear device 34 in the transmission case 24 acting as a non-rotating member. In the automatic transmission 18, known hydraulic friction engagement devices (clutches C1 to C4, brakes B1 and B2) are respectively engaged or released in accordance with a predefined operation table depicted in FIG. 2 to establish a plurality of shift stages having respective different gear ratios $\gamma_{AT}$ (=the rotation speed $N_{ATIN}$ of the input shaft 20/rotation speed $N_{OUT}$ of an output shaft 22) of the automatic transmission 18. In FIG. 2, "○" indicates an engaged state and a blank indicates a released state. An automatic shift control of the automatic transmission 18 is provided in accordance with a known relationship (shift diagram, shift map) having preliminarily stored upshift and downshift lines.

The vehicle drive device 10 configured as described above switches and actuates an engine running causing the vehicle to run with the power of the engine 12 and a motor running causing the vehicle to run with the power of the second electric motor MG2, depending on a running state of the vehicle. The switching between the engine running and the motor running is performed based on which of an engine running range and a motor running range set in the same two-dimensional coordinates as the shift diagram a running state of the vehicle belongs to.

In the vehicle drive device 10, for example, even when the vehicle running state belongs to the motor running range, if a charge remaining amount SOC (state of charge) of the electric storage device 36 is equal to or less than a predetermined value, the engine running is performed. When the vehicle is suddenly started or rapidly accelerated, the control is provided as needed such as using output of both the engine 12 and the second electric motor MG2 for running the vehicle.

Figure 3:
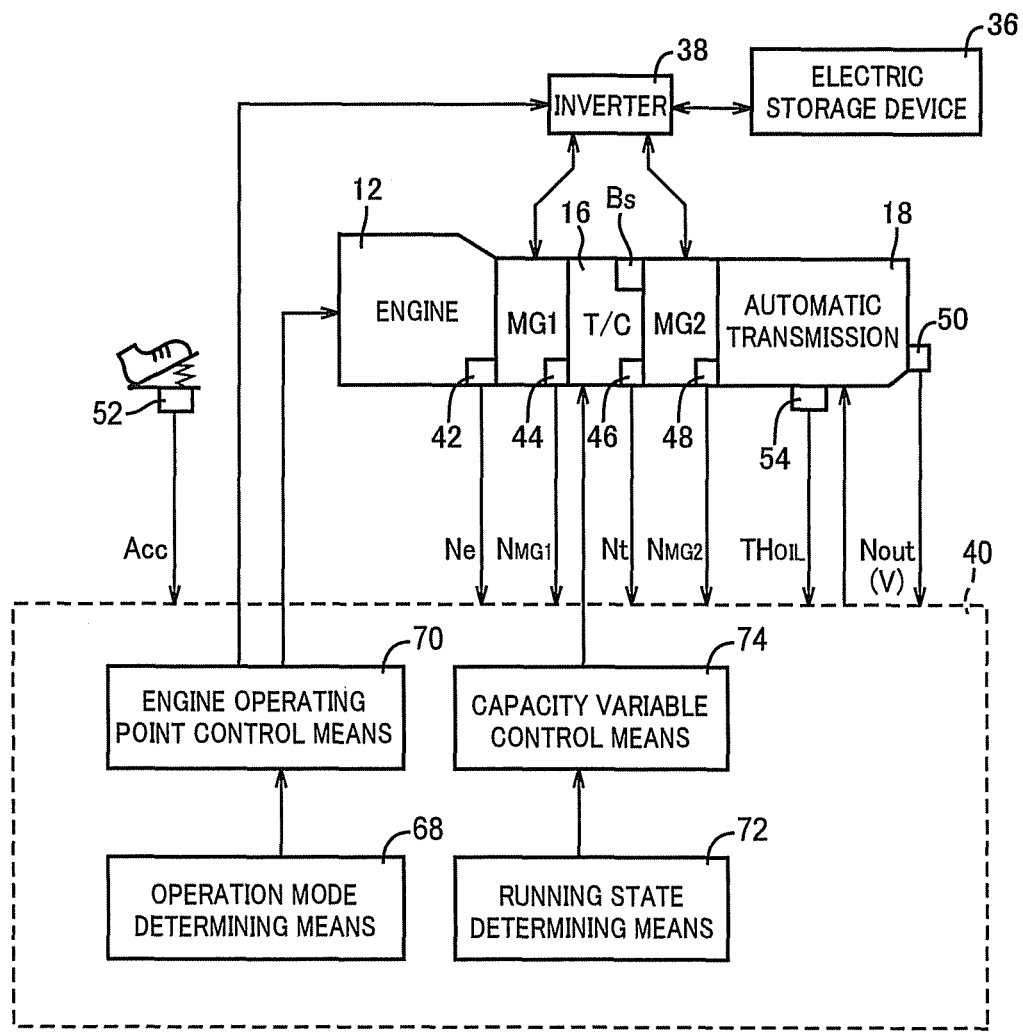
FIG. 3 is a diagram for explaining input signals input from sensors to an electronic control device for controlling the vehicle drive device of FIG. 1 and is a functional block diagram for explaining a main portion of the control function included in the electronic control device.

FIG. 3 is a diagram for explaining input signals input from sensors to an electronic control device 40 for controlling the vehicle drive device 10 and is a functional block diagram for explaining a main portion of the control function included in the electronic control device 40. In FIG. 3, the electronic control device 40 has a function as a control device of the vehicle drive device 10 and includes a so-called microcomputer equipped with a CPU, a RAM, a ROM, and an input/ output interface, and the CPU executes signal processes in accordance with programs stored in advance in the ROM, while utilizing a temporary storage function of the RAM, to provide the output control of the engine 12, the shift control of the automatic transmission 18, and the output control of the electric motors MG1 and MG2. The electronic control device 40 is supplied with various input signals (e.g., rotation speeds Ne, $N_{MG1}$, Nt, $N_{MG2}$, $N_{out}$ (vehicle speed V), an acceleration opening degree Acc, and an operating oil temperature $TH_{OIL}$) detected by respective sensors (e.g., rotation speed sensors 42, 44, 46, 48, 50, an accelerator opening degree sensor 52, and an oil temperature sensor 54) depicted in FIG. 3 disposed on the vehicle. The electronic control device 40 supplies various output signals (e.g., an engine output control signal, an electric motor output control signal, and an oil pressure control signal) to devices disposed on the vehicle.

Figure 4:
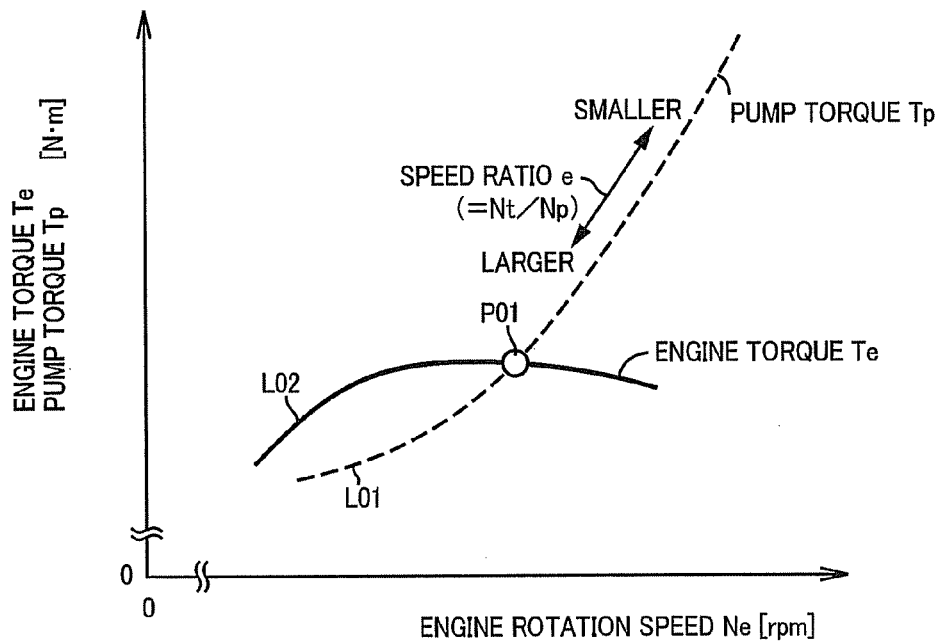
FIG. 4 is a diagram for explaining how the engine operating point is determined while the first electric motor and the second electric motor are not actuated in the vehicle drive device of FIG. 1.

FIG. 4 is a diagram for explaining how the operating point of the engine 12 is determined while the first electric motor MG1 and the second electric motor MG2 are not actuated. As depicted in FIG. 4, a pump torque Tp is an input-side load torque Tp generated in the pump impeller (input-side rotating element) 16$p$ depending on a speed ratio e (=Nt/Np) of the torque converter 16 and has relationship with the engine rotation speed Ne as indicated by, for example, a broken line L01, under a certain turbine rotation speed Nt. The relationship between the pump torque Tp and the engine rotation speed Ne (=Np) indicated by the broken line L01 is relationship satisfying an equation "Tp=τ×Ne$^2$" when expressed by using a capacity coefficient τ of the torque converter 16, which is a function of the speed ratio e. Therefore, as depicted in FIG. 4, when the engine rotation speed Ne is higher, the speed ratio e of the torque converter 16 is smaller, and when the engine rotation speed Ne is higher, the pump torque Tp is larger. On the other hand, an output torque Te of the engine 12 (hereinafter referred to as an engine torque Te) has relationship with the engine rotation speed Ne as indicated by, for example, a solid line L02, under a certain throttle valve opening degree $θ_{TH}$ of an electronic throttle valve of the engine 12, and the solid line L02 intersects with the broken line L01. An intersection point P01 between the broken line L01 and the solid line L02 indicates a point of balance between the engine torque Te and the pump torque Tp and the intersection point P01 is defined as the operating point of the engine 12. Therefore, the operating point of the engine 12 is passively determined based on the turbine rotation speed Nt and the throttle valve opening degree $θ_{TH}$. In contrast, in this example, the operating point of the engine 12 can arbitrarily be changed by providing the output control of the first electric motor MG1 without being constrained by the turbine rotation speed Nt. This can be described with reference to FIG. 5.

Figure 5:
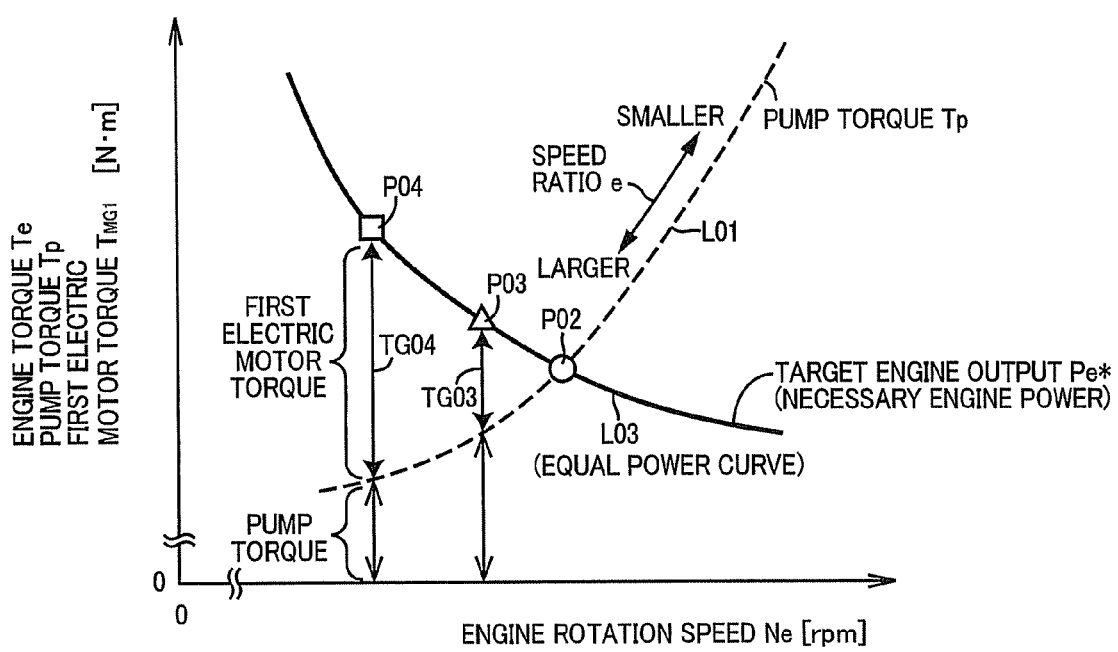
FIG. 5 is a diagram for explaining that the engine operating point can arbitrarily be changed by controlling the first electric motor in the vehicle drive device of FIG. 1.

FIG. 5 is a diagram for explaining that the operating point of the engine 12 can arbitrarily be changed by controlling the first electric motor MG1. In FIG. 5, the same reference numerals as FIG. 4 mutually denote the same elements and the turbine rotation speed Nt is assumed to be the same as FIG. 4. A solid line L03 of FIG. 5 is an equal power curve indicative of relationship between the engine rotation speed Ne and the engine torque Te when a necessary engine power Pe*, i.e., a target engine output Pe* serving as a target value of an engine output Pe (e.g., in kW) is set to a constant value and control is provided such that the engine output Pe converges to the target engine output Pe*. FIG. 5 depicts an example when the operating point of the engine 12 is arbitrarily set on the equal power curve (solid line L03). In FIG. 5, when the relationship between the pump torque Tp and the engine rotation speed Ne is indicated by the broken line L01 and the engine output Pe is set to the target engine output Pe* indicated by the solid line L03, if an output torque $T_{MG1}$ of the first electric motor MG1 (hereinafter referred to as first electric motor torque $T_{MG1}$) is not generated, the operating point of the engine 12 is a point P02; if the first electric motor MG1 is driven to perform electric generation operation and the first electric motor torque $T_{MG1}$ of TG03 is generated in the negative rotation direction, the operating point of the engine 12 is a point P03; and if the absolute value of the first electric motor torque $T_{MG1}$ is raised and the first electric motor torque $T_{MG1}$ of TG04 is generated in the negative rotation direction, the operating point of the engine 12 is a point P04. In short, in the vehicle drive device 10 of this example, the first electric motor torque $T_{MG1}$ can be adjusted such that the sum of the engine torque Te and the first electric motor torque $T_{MG1}$ is balanced with the pump torque Tp, i.e., such that the relationship of "Tp=Te+$T_{MG1}$($T_{MG1}$ of FIG. 5 is a negative value)" is satisfied, so as to arbitrarily change the operating point of the engine 12 without being constrained by the turbine rotation speed Nt. If the first electric motor MG1 is driven to perform electric generation operation, electric power generated by the first electric motor MG1 may be stored in the electric storage device 36; however, the electric power is basically supplied to the second electric motor MG2 and the second electric motor MG2 is driven. Therefore, the vehicle drive device 10 includes two power transmission paths, i.e., an electric path through which power (e.g., in kW) is electrically transmitted by giving/receiving electric power between the first electric motor MG1 and the second electric motor MG2 and a mechanical path through which power is mechanically transmitted via the torque converter 16, in parallel with each other between the engine 12 and the drive wheels 58. Since the operating point of the engine 12 can continuously be changed by adjusting the first electric motor torque $T_{MG1}$ without being constrained by the turbine rotation speed Nt as described above, the first electric motor MG1, the second electric motor MG2, and the torque converter 16 can perform continuously variable transmission operation in which a gear ratio (=Ne/Nt) is changed in a substantially stepless manner as a whole and it can be said that a continuously variable transmission 60 is formed.

Figure 6:
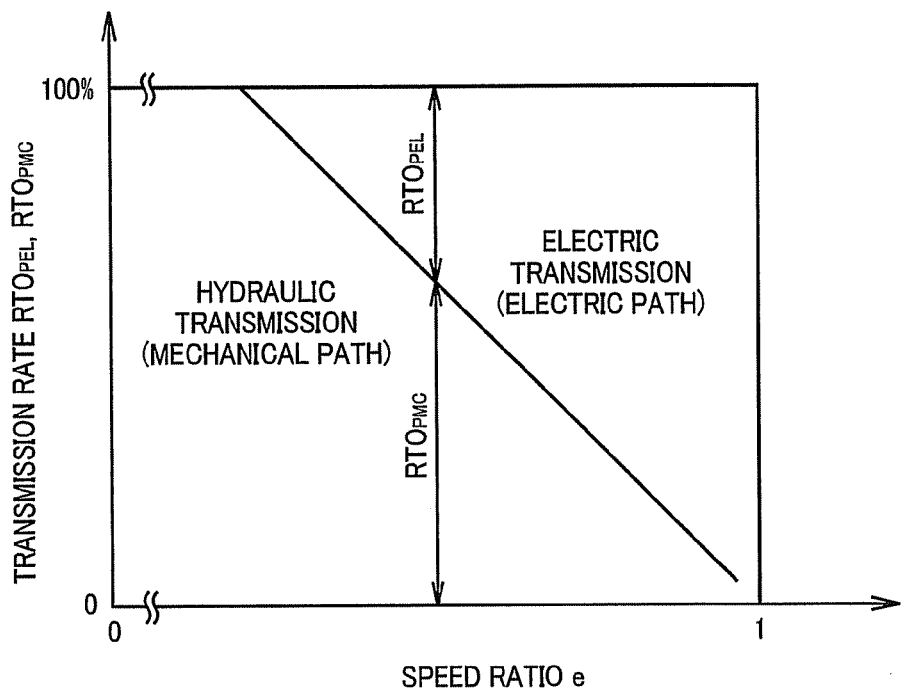
FIG. 6 is a conceptual diagram for explaining a proportion (transmission rate) of power transmitted through each of the electric path and the mechanical path when the engine operating point is changed under a certain target engine output in the vehicle drive device of FIG. 1.

FIG. 6 is a conceptual diagram for explaining a proportion (transmission rate) of power transmitted through each of the electric path and the mechanical path when the operating point of the engine 12 is changed under a certain target engine output Pe*. In FIG. 6, electric transmission represents that the power from the engine 12 is electrically transmitted, and therefore means the power transmission through the electric path, and hydraulic transmission represents that the power from the engine 12 is transmitted through fluid in the torque converter 16, and therefore means the power transmission through the mechanical path. In FIG. 5, the output control of the first electric motor MG1 is provided such that the first electric motor torque $T_{MG1}$ increases in absolute value in the negative rotation direction as the engine rotation speed Ne becomes lower, i.e., the speed ratio e of the torque converter 16 becomes larger and, therefore, as depicted in FIG. 6, when the speed ratio e becomes larger toward one, a transmission rate $RTO_{PEL}$ of power through the electric transmission becomes larger while a transmission rate $RTO_{PMC}$ of power through the hydraulic transmission becomes smaller and, specifically, when the speed ratio e is closer to one, the transmission rate $RTO_{PEL}$ of power through the electric transmission becomes closer to 100%. This tendency of change in the transmission rates $RTO_{PEL}$ and $RTO_{PMC}$ relative to the speed ratio e is the same regardless of the target engine output Pe* or the turbine rotation speed Nt.

Figure 7:
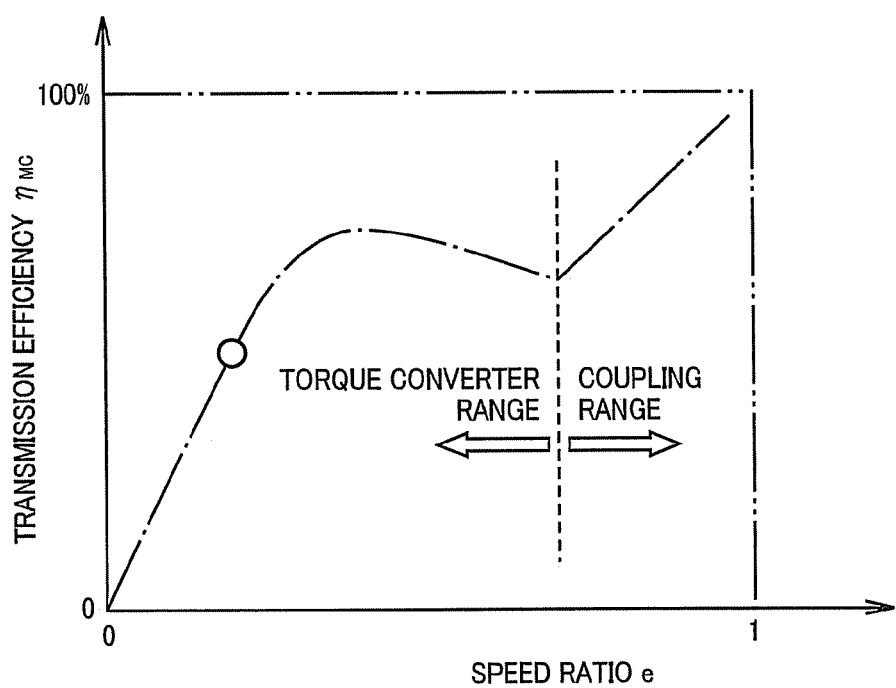
FIG. 7 is a diagram of relationship between transmission efficiency of the torque converter only, i.e., transmission efficiency of the mechanical path and a speed ratio of the torque converter in the vehicle drive device of FIG. 1.

Power transmission efficiency (=output power/input power; also simply referred to as transmission efficiency throughout the description) in the continuously variable transmission 60 made up of the first electric motor MG1, the second electric motor MG2, and the torque converter 16 will be described. First, transmission efficiency $\eta_{MC}$ of the torque converter 16 only, i.e., transmission efficiency $\eta_{MC}$ of the mechanical path, will be described with reference to FIG. 7. As depicted in FIG. 7, in a torque converter range on the side of a smaller speed ratio e, the transmission efficiency $\eta_{MC}$ of the torque converter 16 has a local maximum value at a predetermined speed ratio e and the transmission efficiency $\eta_{MC}$ becomes zero when the speed ratio e is zero. In a coupling range on the side of a larger speed ratio e, the transmission efficiency $\eta_{MC}$ becomes higher when the speed ratio e is larger, and the transmission efficiency $\eta_{MC}$ becomes highest when the speed ratio e is close to one in the torque converter range and the coupling range as a whole. Considering transmission efficiency $\eta_{EL}$ of the electric path and the transmission rates $RTO_{PEL}$ and $RTO_{PMC}$ depicted in FIG. 6 along with the transmission efficiency $\eta_{MC}$ of the torque converter 16, combined transmission efficiency $\eta_{CVT}$ can be obtained that is transmission efficiency in the case of transmitting the power from the engine 12 through the electric path and the mechanical path, i.e., the transmission efficiency $\eta_{CVT}$ of the entire continuously variable transmission 60.

Figure 8:
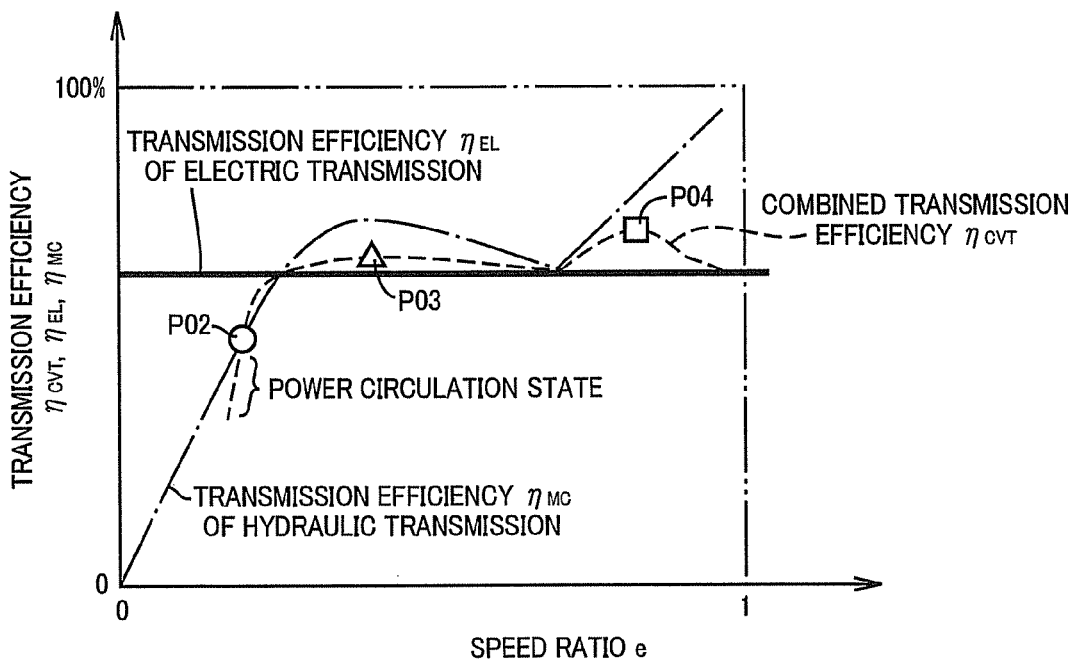
FIG. 8 is a diagram of relationship between the combined transmission efficiency and the speed ratio of the torque converter in the vehicle drive device of FIG. 1.

FIG. 8 is a diagram of relationship between the combined transmission efficiency $\eta_{CVT}$ and the speed ratio e of the torque converter 16 when it is assumed that the transmission efficiency $\eta_{EL}$ of the electric path is constant. In FIG. 8, a dashed-dotted line indicative of the transmission efficiency $\eta_{MC}$ of the mechanical path (hydraulic transmission) is the same as that of FIG. 7. As indicated by a solid line of FIG. 8, the transmission efficiency $\eta_{EL}$ of the electric path (electric transmission) is almost unchanged even when the speed ratio e of the torque converter 16 is changed, as compared to the transmission efficiency $\eta_{MC}$ of the mechanical path (hydraulic transmission). If the power from the engine 12 is transmitted through both the mechanical path and the electric path at the transmission rates $RTO_{PEL}$ and $RTO_{PMC}$ as depicted in FIG. 6 depending on the speed ratio e, the combined transmission efficiency $\eta_{CVT}$ is changed as indicated by a broken line in accordance with the speed ratio e. The points P02, P03, and P04 of FIG. 8 are the points P02, P03, and P04, respectively, of FIG. 5 expressed on the coordinate system of FIG. 8 and, in the case of FIG. 8, the combined transmission efficiency $\eta_{CVT}$ becomes highest at the speed ratio e indicated by the point P04 among the three points P02, P03, and P04. In FIG. 8, in a range of the speed ratio e lower than the speed ratio e indicated by the point P02, the combined transmission efficiency $\eta_{CVT}$ indicated by a broken line is significantly reduced lower than the transmission efficiency $\eta_{MC}$ of the mechanical path, and this is because the electric power transmission state between the first electric motor MG1 and the second electric motor MG2 turns to a power circulation state in which the first electric motor MG1 consumes electric power while the second electric motor MG2 generates electricity, or in other words, a power circulation state in which power is electrically transmitted from the second electric motor MG2 to the first electric motor MG1.

Since the vehicle drive device 10 can continuously change the operating point of the engine 12 by adjusting the first electric motor torque $T_{MG1}$ without being constrained by the turbine rotation speed Nt as described above, this example utilizes this function, i.e., the continuously variable transmission function of the continuously variable transmission 60 to provide control for efficiently activating the engine 12 and, moreover, for allowing the vehicle drive device 10 including the engine 12 to efficiently operate as a whole. A main portion of the control function will hereinafter be described.

Returning to FIG. 3, as depicted in FIG. 3, the electronic control device 40 includes an operation mode determining means 68 as an operation mode determining portion, and an engine operating point control means 70 as an engine operating point control portion.

The operation mode determining means 68 determines whether a predetermined system optimum operation mode is selected. For example, if an operation mode switch is turned on that is a switch switched on when a driver selects the system optimum operation mode, the operation mode determining means 68 determines that the system optimum operation mode is selected. The system optimum operation mode is an operation mode for achieving efficiency improvement in the engine 12 and the continuously variable transmission 60 as a whole rather than efficiently activating only the engine 12, and is selected when it is desired to give very high priority to the fuel efficiency improvement. The system optimum operation mode may automatically be selected, for example, when the accelerator opening degree Acc is almost unchanged, instead of depending on switching of the operation mode switch.

Figure 9:
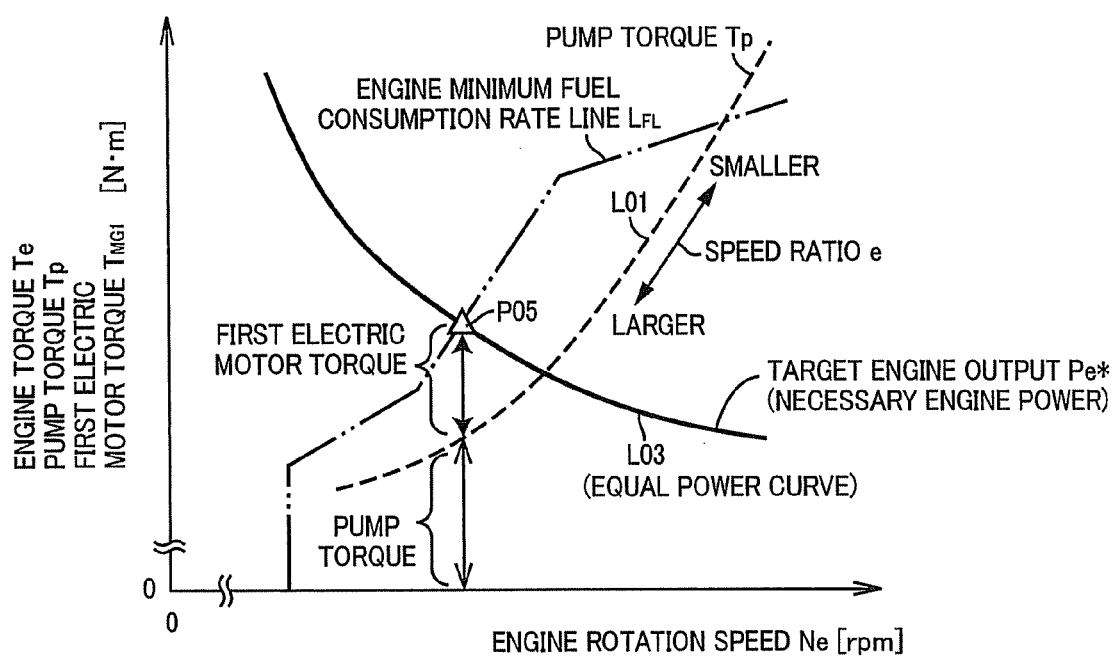
FIG. 9 is a diagram of the first electric motor torque and the pump torque when an operating point on the engine minimum fuel consumption rate line is defined as the target engine operating point in the coordinate system same as FIG. 5 under a certain turbine rotation speed.

The engine operating point control means 70 provides the engine operating point control in which the first electric motor torque $T_{MG1}$ is adjusted to control the operating point of the engine 12 during the engine running. When the first electric motor torque $T_{MG1}$ is adjusted, specifically, as depicted in FIG. 5, the first electric motor torque $T_{MG1}$ is adjusted such that the sum of the engine torque Te and the first electric motor torque $T_{MG1}$ is balanced with the pump torque Tp that is the input-side load torque of the torque converter 16. Since the engine operating point control means 70 basically causes the first electric motor MG1 to perform the electric generation operation in the engine operating point control, the first electric motor torque $T_{MG1}$ is a negative value except for the power circulation state. Specifically describing the engine operating point control, first, the engine operating point control means 70 sequentially determines the target engine operating point as an operating point P05 of the engine 12 at which the target engine output Pe* is achieved on an engine minimum fuel consumption rate line $L_{FL}$ determined in advance as depicted in FIG. 9. FIG. 9 is a diagram of the first electric motor torque $T_{MG1}$ and the pump torque Tp when an operating point on the engine minimum fuel consumption rate line $L_{FL}$ is defined as the target engine operating point in the coordinate system same as FIG. 5 under a certain turbine rotation speed Nt, and the broken line L01 and the solid line L03 of FIG. 9 are the same as those of FIG. 5. The engine minimum fuel consumption rate line $L_{FL}$ is an operating curve of the engine 12 indicative of relationship between the engine rotation speed Ne and the engine torque Te empirically determined in advance such that the fuel consumption rate of the engine 12 is minimized, or in other words, is a series of fuel efficiency optimum points that are operating points optimal for the fuel efficiency improvement of the engine 12. The target engine output (necessary engine power) Pe* is an output requested by a driver to a vehicle and is sequentially determined by the engine operating point control means 70 based on the accelerator opening degree Acc and the vehicle speed V from relationship empirically determined in advance so as to accommodate the output request from the driver and, for example, the target engine output Pe* is determined to be larger when the accelerator opening degree Acc is larger. If the charge remaining amount SOC of the electric storage device 36 is reduced to a predetermined lower limit value or lower, a charge request is made to indicate that the electric storage device 36 should be charged and, preferably, for the target engine output Pe*, an electric power based on the charge request (required charging power) is added to a calculation value based on the accelerator opening degree Acc and the vehicle speed V.

After determining the target engine operating point (point P05) on the engine minimum fuel consumption rate line $L_{FL}$ as described above, the engine operating point control means 70 calculates the pump torque Tp based on the engine rotation speed Ne indicated by the point P05 and calculates the first electric motor torque $T_{MG1}$ based on the pump torque Tp and the engine torque Te indicated by the point P05 as depicted in FIG. 9. The engine operating point control means 70 then calculates the speed ratio e of the torque converter 16 from the engine rotation speed Ne indicated by the point P05 and the turbine rotation speed Nt.

After calculating the pump torque Tp and the first electric motor torque $T_{MG1}$ based on the target engine operating point (point P05) on the engine minimum fuel consumption rate line $L_{FL}$, since the transmission rate $RTO_{PMC}$ of the mechanical path and the transmission rate $RTO_{PEL}$ of the electric path are respectively obtained from the mechanical path output transmitted through the mechanical path and the electric path output transmitted through the electric path, the engine operating point control means 70 can calculate the combined transmission efficiency $\eta_{CVT}$ based on the speed rate e and the transmission rates $RTO_{PEL}$ and $RTO_{PMC}$ from the relationship between the speed ratio e and the transmission efficiency $\eta_{MC}$ of the mechanical path empirically obtained and set in advance and the relationship between the speed ratio e and the transmission efficiency $\eta_{EL}$ of the electric path empirically obtained and set in advance, as depicted in FIG. 8. Therefore, the engine operating point control means 70 sequentially calculates the combined transmission efficiency $\eta_{CVT}$.

Along with the calculation of the combined transmission efficiency $\eta_{CVT}$, the engine operating point control means 70 sequentially calculates engine efficiency $\eta_{ENG}$ based on the engine rotation speed Ne and the engine torque Te indicated by the target engine operating point (point P05) on the engine minimum fuel consumption rate line $L_{FL}$, from a relationship (engine efficiency map) empirically obtained and determined in advance between the operating point of the engine 12, which is indicated by the engine rotation speed Ne and the engine torque Te, and the engine efficiency $\eta_{ENG}$. The engine operating point control means 70 also sequentially calculates combined efficiency $\eta_{TOTAL}$, i.e., total efficiency $\eta_{TOTAL}$, acquired as the product of the calculated combined transmission efficiency $\eta_{CVT}$ and the engine efficiency $\eta_{ENG}$. The engine efficiency $\eta_{ENG}$ is a proportion of heat quantity converted into work for a lower heating value when fuel supplied to the engine 12 is completely combusted.

The engine operating point control means 70 switches details of control in the engine operating point control depending on determination of the operation mode determining means 68. Specifically, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$.

For example, when shifting the target engine operating point to the side of greater total efficiency $\eta_{TOTAL}$ as described above, the engine operating point control means 70 gradually shifts the target engine operating point on the equal power curve (e.g., the solid line L03 of FIG. 9) indicative of the target engine output Pe* and sequentially calculates the first electric motor torque $\eta_{MG1}$ as well as the total efficiency $\eta_{TOTAL}$ based on the target engine operating point each time the target engine operating point is shifted. The target engine operating point at the local maximum (preferably the maximum) of the total efficiency $\eta_{TOTAL}$ is determined as the final target engine operating point.

On the other hand, if the operation mode determining means 68 determines that the system optimum operation mode is not selected, the engine operating point control means 70 does not shift the target engine operating point to the side of greater total efficiency $\eta^{TOTAL}$ from the engine minimum fuel consumption rate line $L_{FL}$ as described above and determines the target engine operating point (point P05 of FIG. 9) on the engine minimum fuel consumption rate line $L_{FL}$ as the final target engine operating point.

If the operation mode determining means 68 determines that the system optimum operation mode is selected or that the system optimum operation mode is not selected, when the final target engine operating point is determined, the engine operating point control means 70 sequentially sets the engine rotation speed Ne and the engine torque Te indicated by the final target engine operating point as target values, i.e., a target engine rotation speed Ne* and a target engine torque Te*, respectively, and also sequentially sets the first electric motor torque $T_{MG1}$ and the first electric motor rotation speed $N_{MG1}$ (=engine rotation speed Ne) corresponding to the final target engine operating point as target values, i.e., a target first electric motor torque $T_{MG1}$* and a target first electric motor rotation speed $N_{MG1}$*, respectively. The engine operating point control means 70 adjusts the throttle valve opening degree $\theta_{TH}$ to provide the output control of the engine 12 such that the actual engine torque Te matches, for example, follows, the target engine torque Te* and also controls the first electric motor MG1 such that the actual first electric motor torque $T_{MG1}$ matches (follows) the target first electric motor torque $T_{MG1}$* and that the actual first electric motor rotation speed $N_{MG1}$ matches (follows) the target first electric motor rotation speed $N_{MG1}$*. As described above, the engine operating point control means 70 provides the engine operating point control.

Matching the actual first electric motor rotation speed $N_{MG1}$ with the target first electric motor rotation speed $N_{MG1}$* corresponds to matching the actual engine rotation speed Ne with the target engine rotation speed Ne*.

The engine operating point control means 70 transmits an output torque $T_{MG2}$ of the second electric motor MG2 (hereinafter referred to as second electric motor torque $T_{MG2}$) to the drive wheels 58 in the engine operating point control. Although the engine operating point control means 70 basically supplies electric power generated by the first electric motor MG1 directly to the second electric motor MG2 to drive the second electric motor MG2 in this case, if the charge request is made, the engine operating point control means 70 calculates the target engine output Pe* increased by the required charging power to be stored in the electric storage device 36 in accordance with the charge request and supplies to the second electric motor MG2 a remaining portion of the electric power generated by the first electric motor MG1 after subtracting the electric power to be stored into the electric storage device 36, thereby driving the second electric motor MG2. Since the engine operating point control causes all or a portion of the electric power generated by the first electric motor MG1 to be consumed by the second electric motor MG2, the second electric motor torque $T_{MG2}$ is a torque corresponding to the first electric motor torque $T_{MG1}$ and, if the consumed electric power in the second electric motor MG2 is suppressed, the first electric motor torque $T_{MG1}$ is indirectly suppressed in this relationship. Therefore, in the engine operating point control, the adjustment of the first electric motor torque $T_{MG1}$ may be considered as the adjustment of the power transmitted through the electric path and as the adjustment of the second electric motor torque $T_{MG2}$.

Figure 10:
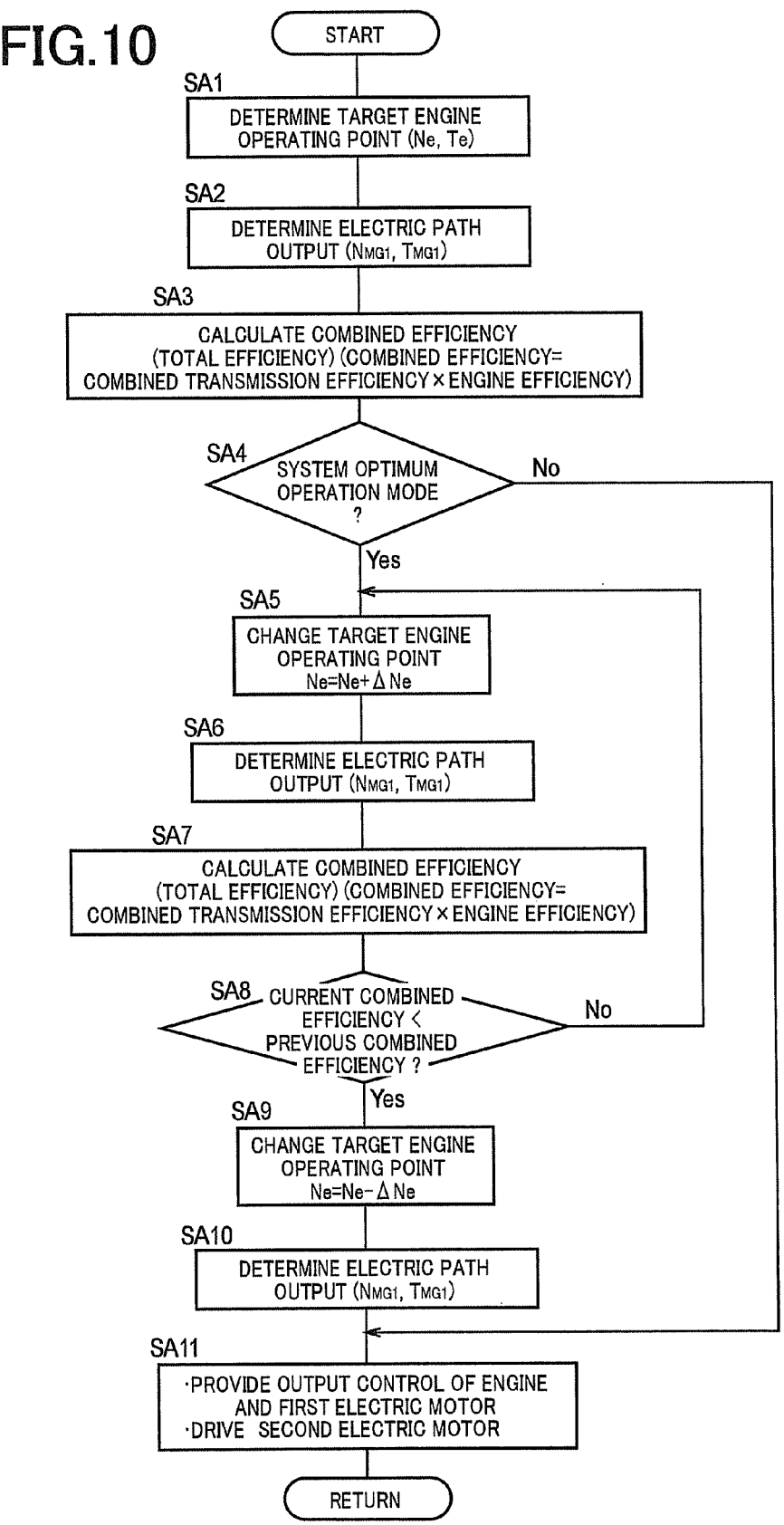
FIG. 10 is a flowchart for explaining a main portion of the control operation of the electronic control device in FIG. 3, i.e., the control operation of determining the engine operating point by utilizing the continuously variable transmission operation of the continuously variable transmission.

FIG. 10 is a flowchart for explaining a main portion of the control operation of the electronic control device 40, i.e., the control operation of determining the operating point of the engine 12 by utilizing the continuously variable transmission operation of the continuously variable transmission 60 and is repeatedly executed with an extremely short cycle time, for example, on the order of a few msec to a few tens of msec. The control operation depicted in FIG. 10 is performed solely or concurrently with another control operation. Steps (hereinafter, "step" will be omitted) SA1 to SA3 and SA5 to SA11 correspond to the engine operating point control means 70 and SA4 corresponds to the operation mode determining means 68.

First, at SA1, a target engine output (necessary engine power) Pe* is calculated based on the accelerator opening degree Acc and the vehicle speed V from a predetermined relationship. The target engine output Pe* may be calculated to be larger by the charging power if the electric storage device 36 is charged, or may be calculated to be smaller by the discharging power if the electric storage device 36 is discharged. At SA1, a target engine operating point is determined as an operating point (e.g., the point P05 of FIG. 9) of the engine 12 at which the calculated target engine output Pe* is achieved on the engine minimum fuel consumption rate line $L_{FL}$ as depicted in FIG. 9. SA1 is followed by SA2.

At SA2, as exemplarily illustrated in FIG. 9, the first electric motor torque $T_{MG1}$ is calculated and determined based on the target engine operating point (e.g., the point P05) determined at SA1. In other words, electric path output (e.g., in kW) transmitted through the electric path corresponding to the target engine operating point is calculated based on the first electric motor torque $T_{MG1}$ and the first electric motor rotation speed $N_{MG1}$ (=engine rotation speed Ne). Mechanical path output (e.g., in kW) transmitted through the mechanical path corresponding to the target engine operating point is calculated based on the pump torque Tp and the pump rotation speed Np (=engine rotation speed Ne). SA2 is followed by SA3.

At SA3, the combined transmission efficiency $\eta_{CVT}$ based on the target engine operating point determined at SA1 is calculated from the relationship between each of the transmission efficiency $\eta_{MC}$ of the mechanical path and the transmission efficiency $\eta_{EL}$ of the electric path, and the speed ratio e as depicted in FIG. 8 based on the turbine rotation speed Nt detected by the turbine rotation speed sensor 52, the engine rotation speed Ne indicated by the target engine operating point, and the electric path output and the mechanical path output calculated at SA2. The engine efficiency $\eta_{ENG}$ based on the target engine operating point determined at SA1 is also calculated. The product of the combined transmission efficiency $\eta_{CVT}$ and the engine efficiency $\eta_{ENG}$ is calculated as the total efficiency (combined efficiency) $\eta_{TOTAL}$. SA3 is followed by SA4.

At SA4, it is determined whether the system optimum operation mode is selected. If the determination at SA4 is affirmative, i.e., if the system optimum operation mode is selected, the operation goes to SA5. On the other hand, if the determination at SA4 is negative, the operation goes to SA11.

At SA5, the engine rotation speed Ne indicated by the target engine operating point is increased by a predetermined change amount ΔNe to determine a new target engine operating point. This stepwise change in the target engine operating point is made such that the target engine output Pe* calculated at SA1 is not changed. Therefore, the engine torque Te indicated by the target engine operating point is changed along with the change in the engine rotation speed Ne indicated by the target engine operating point. The target engine operating point before the change at SA5 is referred to as a previous target engine operating point and the target engine operating point after the change is referred to as a current target engine operating point. SA5 is followed by SA6.

At SA6, as is the case with SA2, the first electric motor torque $T_{MG1}$ is calculated based on the current target engine operating point, and the electric path output and the mechanical path output corresponding to the current target engine operating point are calculated. SA6 is followed by SA7.

At SA7, as is the case with SA3, the combined transmission efficiency $\eta_{CVT}$ based on the current target engine operating point is calculated and the engine efficiency $\eta_{ENG}$ based on the current target engine operating point is calculated. The product of the combined transmission efficiency $\eta_{CVT}$ and the engine efficiency $\eta_{ENG}$ is calculated as the total efficiency (combined efficiency) $\eta_{TOTAL}$ (referred to as current combined efficiency). Previous combined efficiency, i.e., the total efficiency (combined efficiency) $\eta_{TOTAL}$ based on the previous target engine operating point, is stored in advance for determination at SA8. SA7 is followed by SA8.

At SA8, it is determined whether the previous combined efficiency is greater than the current combined efficiency. If the determination at SA8 is affirmative, i.e., if the previous combined efficiency is greater than the current combined efficiency, the operation goes to SA9. On the other hand, if the determination at SA8 is negative, the operation goes to SA5.

At SA9, the target engine operating point is returned to the previous target engine operating point. In other words, the engine rotation speed Ne indicated by the current target engine operating point determined at SA5 is reduced by the predetermined change amount ΔNe to determine a new target engine operating point. In this case, as is the case with SA5, the engine torque Te indicated by the target engine operating point is also changed, i.e., returned to the previous torque, such that the target engine output Pe* is not changed. SA9 is followed by SA10.

At SA10, as is the case with SA2, the first electric motor torque $\eta_{MG1}$ is calculated based on the target engine operating point newly determined at SA9, and the electric path output and the mechanical path output corresponding to the target engine operating point newly determined at SA9 are calculated. SA10 is followed by SA11.

At SA11, the output control of the engine 12 and the first electric motor MG1 is provided such that an actual operating point of the engine 12 indicated by the actual engine rotation speed Ne and engine torque Te matches, for example, follows, the finally determined target engine operating point. The second electric motor torque $T_{MG2}$ is transmitted to the drive wheels 58. Although the electric power generated by the first electric motor MG1 is directly supplied to the second electric motor MG2 to drive the second electric motor MG2 in this case, if the electric storage device 36 is charged, the second electric motor MG2 is supplied with a remaining portion of the electric power generated by the first electric motor MG1 after subtracting the electric power to be stored into the electric storage device 36, so as to drive the second electric motor MG2.

This example has the following effects (A1) to (A4). (A1) According to this example, the first electric motor MG1, the second electric motor MG2, and the torque converter 16 make up the continuously variable transmission 60 as a whole and the engine operating point control means 70 provides the engine operating point control in which the first electric motor torque $T_{MG1}$ is adjusted to control the operating point of the engine 12 during the engine running. In the engine operating point control, the second electric motor torque $T_{MG2}$ is transmitted to the drive wheels 58. Therefore, since the continuously variable transmission operation of the continuously variable transmission 60 can be performed by adjusting the first electric motor torque $T_{MG1}$ (basically, regenerative torque) and the continuously variable transmission operation of the continuously variable transmission 60 enables the operating point of the engine 12 to be controlled without being constrained by the turbine rotation speed Nt, the engine 12 can be driven at an operating point optimal for the fuel efficiency improvement (fuel efficiency optimum point), for example, and the vehicle fuel efficiency can be improved.

(A2) According to this example, as depicted in FIG. 5, the engine operating point control means 70 adjusts the first electric motor torque $T_{MG1}$ such that the sum of the engine torque Te and the first electric motor torque $T_{MG1}$ is balanced with the pump torque Tp that is the input-side load torque of the torque converter 16. Therefore, the first electric motor torque $T_{MG1}$ can easily be adjusted based on the characteristics of the torque converter 16.

(A3) According to this example, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$. Therefore, as compared to the case that the operating point of the engine 12 is not changed depending on the total efficiency $\eta_{TOTAL}$, the efficiency of the vehicle drive device 10 is increased as a whole and the vehicle fuel efficiency can be improved.

(A4) According to this example, if the operation mode determining means 68 determines that the system optimum operation mode is not selected, the engine operating point control means 70 controls the operating point of the engine 12 such that the operating point of the engine 12 is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60.

Figure 11:
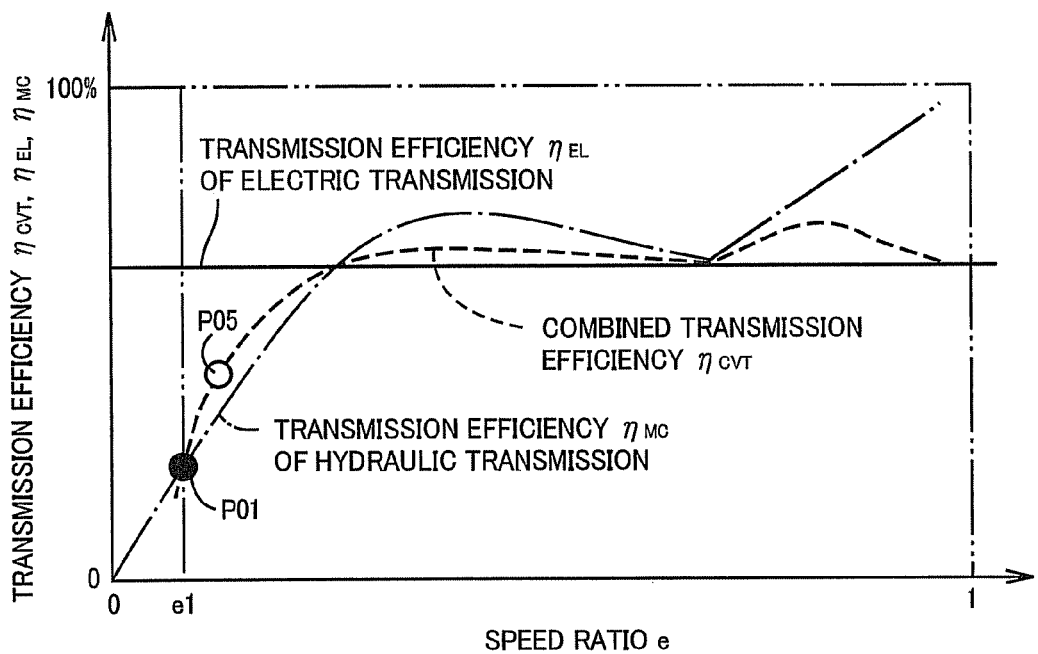
FIG. 11 is a diagram of a point corresponding to the engine operating point passively determined from the hydraulic characteristic of the torque converter and a point corresponding to the engine operating point moved to the target engine operating point on the engine minimum fuel consumption rate line through the engine operating point control in the same coordinate system as FIG. 8.
Figure 12:
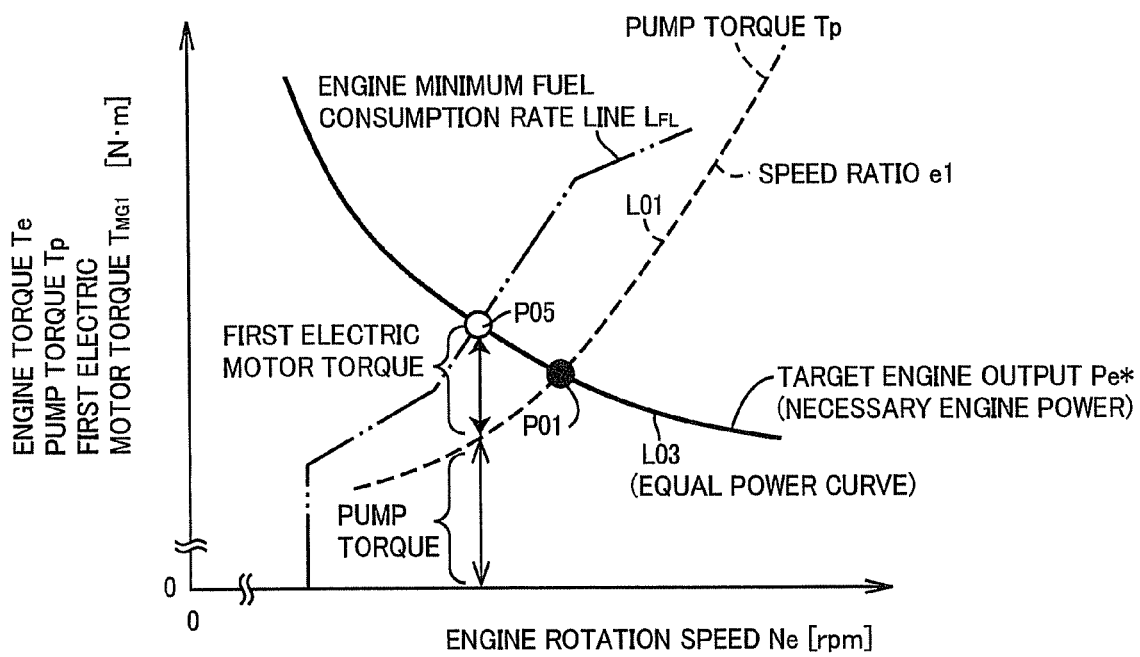
FIG. 12 is a diagram of engine operating points corresponding to the respective points of FIG. 11 and the first electric motor torque and the pump torque at the engine operating point moved to the target engine operating point in the same coordinate system as FIG. 9.

If the engine operating point control is provided, the operating point of the engine 12 can arbitrarily be controlled; however, the hydraulic characteristic of the torque converter 16 is uniquely determined by a hardware configuration of the pump impeller 16p etc., and therefore, at the engine operating point during the engine operating point control, the respective transmission rates $RTO_{PEL}$ and $RTO_{PMC}$ of the electric path and the mechanical path are also uniquely determined. FIG. 11 is a diagram of a point P01 corresponding to the engine operating point passively determined from the hydraulic characteristic of the torque converter 16 and a point P05 corresponding to the engine operating point moved to the target engine operating point on the engine minimum fuel consumption rate line $L_{FL}$ through the engine operating point control on the assumption that the transmission efficiency $\eta_{EL}$ of the electric path is constant in the same coordinate system as FIG. 8. FIG. 12 is a diagram of engine operating points P01 and P05 corresponding to the respective points P01 and P05 of FIG. 11 and the first electric motor torque $T_{MG1}$ and the pump torque Tp at the engine operating point P05 moved to the target engine operating point in the same coordinate system as FIG. 9. In FIGS. 11 and 12, the transmission efficiency $\eta_{EL}$ of the electric path is higher than the transmission efficiency $\eta_{MC}$ of the mechanical path in the range of the speed ratio e of the torque converter 16 at the engine operating point P05 in this case and, therefore, it is considered that the combined transmission efficiency $\eta_{CVT}$ is more improved by increasing the transmission rate $RTO_{PEL}$ of the electric path. However, the pump torque Tp at the engine operating point P05 is uniquely determined from the hydraulic characteristic of the torque converter 16 and, as a result, the first electric motor torque $T_{MG1}$ at the engine operating point P05 is also uniquely determined. Therefore, the electric path with better transmission efficiency may not sufficiently be used.

Figure 13:
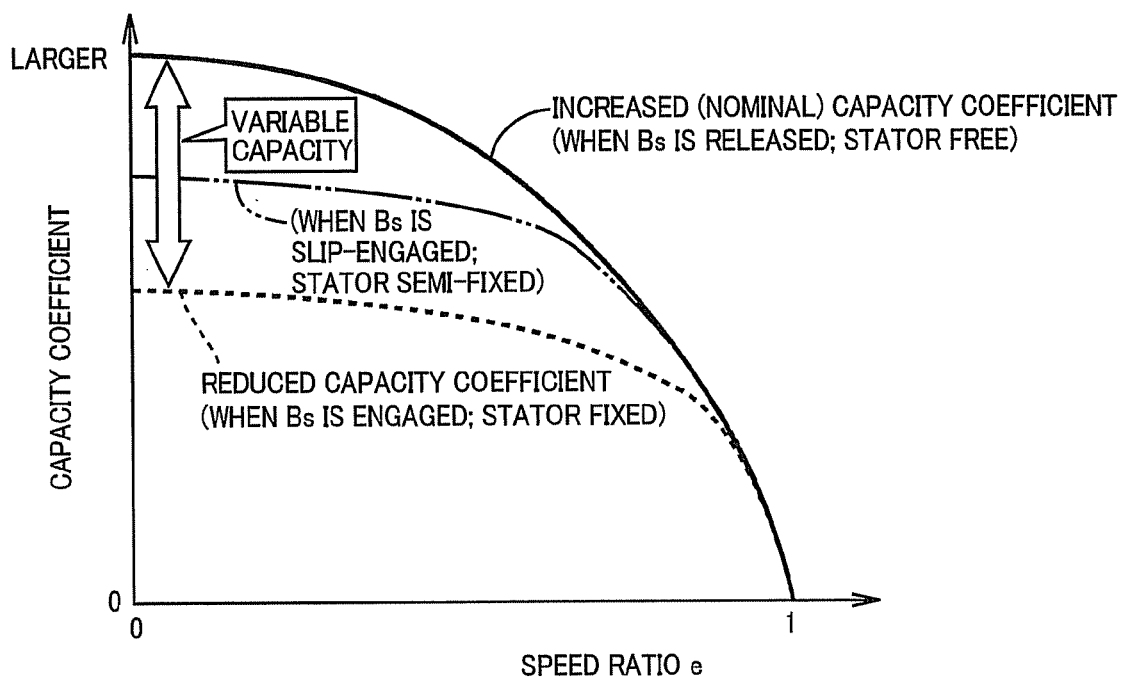
FIG. 13 is a diagram of the hydraulic characteristic (positive drive capacity coefficient) of the torque converter changed by controlling the engagement operation of the brake.

The vehicle drive device 10 of this example includes the brake Bs and the electronic control device 40 can control the rotating operation (i.e., rotation speed) of the stator impeller 16s by controlling the engagement operation of the brake Bs. As a result, the capacity coefficient τ (having the same meaning as a capacity) can be changed as the hydraulic characteristic of the torque converter 16. FIG. 13 is a diagram of the hydraulic characteristic (positive drive capacity coefficient τ) of the torque converter 16 changed by controlling the engagement operation of the brake Bs (i.e., controlling the rotation speed of the stator impeller 16s). In FIG. 13, a solid line indicates a capacity coefficient τ when the brake Bs is released; a broken line indicates a capacity coefficient τ when the brake Bs is engaged; and a dashed-two dotted line indicates a capacity coefficient τ when the brake Bs is slip-engaged. When the brake Bs is released, the stator impeller 16s is freely rotated in a stator free state and the capacity coefficient τ is increased as indicated by the solid line at the same speed ratio e. On the other hand, if the brake Bs is engaged, the stator impeller 16s is stopped rotating in a stator fixed state and the capacity coefficient τ is decreased as indicated by the broken line at the same speed ratio e. On the other hand, if the brake Bs is slip-engaged, the rotation of the stator impeller 16s is allowed to some extent depending on a torque capacity of the brake Bs in a stator semi-fixed state, and the capacity coefficient τ is made variable between the stator free state and the state fixed state as indicated by the dashed-two dotted line at the same speed ratio e. As described above, the brake Bs acts as a capacity variable device changing the capacity coefficient τ of the torque converter 16 by controlling the rotating operation of the stator impeller 16s.

Figure 14:
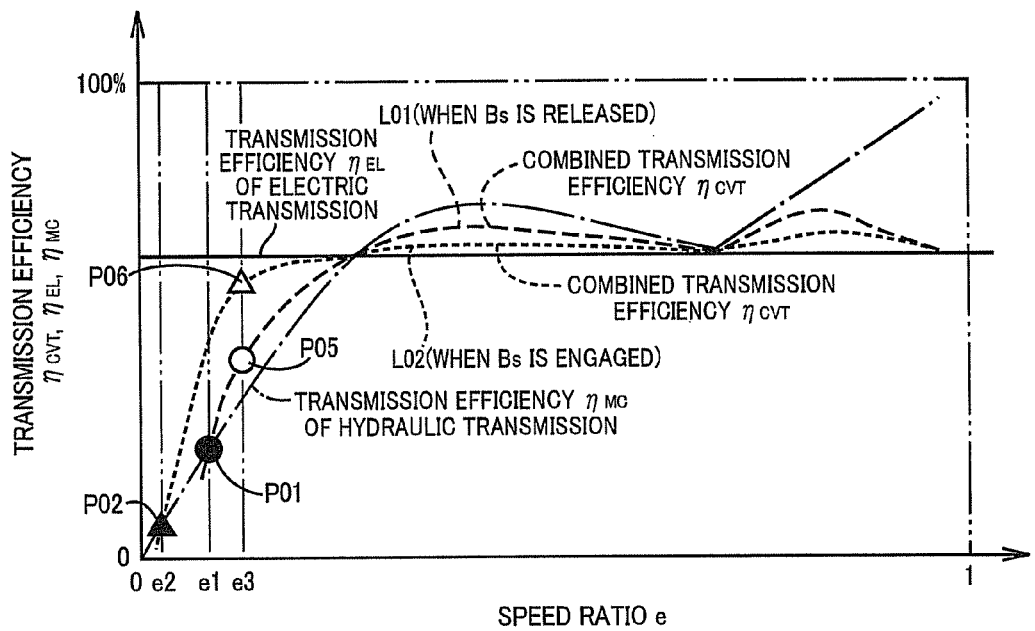
FIG. 14 is a diagram of comparison of a difference in the combined transmission efficiency generated by a difference in the capacity coefficient of the torque converter when the engine operating point is moved to the same target engine operating point through the engine operating point control in the same coordinate system as FIG. 11.
Figure 15:
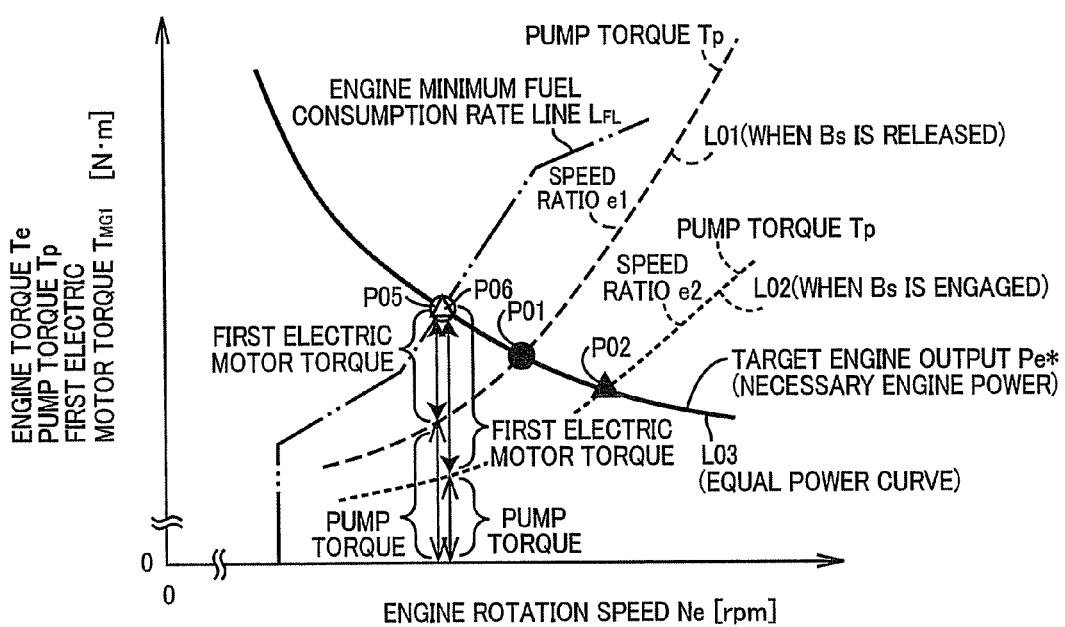
FIG. 15 is a diagram of engine operating points corresponding to the respective points of FIG. 14 and the first electric motor torque and the pump torque at each of the engine operating points moved to the target engine operating point in the same coordinate system as FIG. 12.
Figure 16:
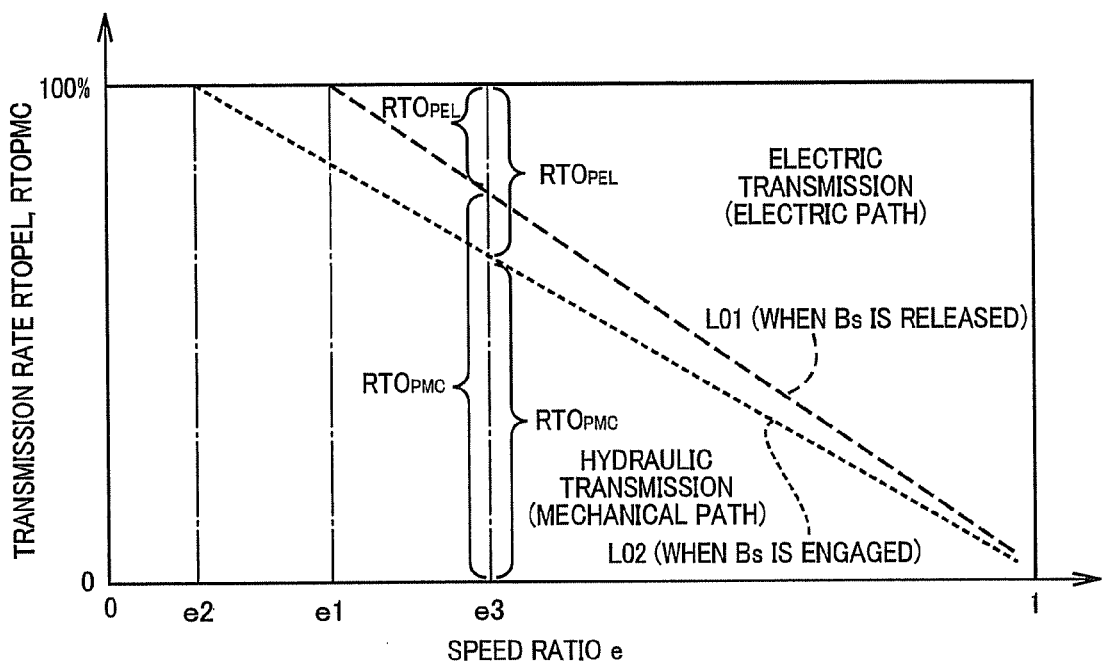
FIG. 16 is a diagram for explaining a change in proportion between the transmission rates generated by a difference in the capacity coefficient of the torque converter corresponding to FIGS. 14 and 15 in the coordinate system same as FIG. 6.

Therefore, although the pump torque Tp is uniquely determined from the hydraulic characteristic of the torque converter 16, the capacity coefficient τ of the torque converter 16 can be changed to vary the pump torque Tp depending on a change in the capacity coefficient τ. FIG. 14 is a diagram of comparison of a difference in the combined transmission efficiency $\eta_{CVT}$ generated by a difference in the capacity coefficient τ of the torque converter 16 when the engine operating point is moved to the same target engine operating point on the engine minimum fuel consumption rate line $L_{FL}$ through the engine operating point control on the assumption that the transmission efficiency $\eta_{EL}$ of the electric path is constant in the same coordinate system as FIG. 11. FIG. 15 is a diagram of engine operating points P01, P05, p02, and P06 corresponding to the respective points P01, P05, p02, and P06 of FIG. 14 and the first electric motor torque $T_{MG1}$ and the pump torque Tp at each of the engine operating points P05 and P06 moved to the target engine operating point in the same coordinate system as FIG. 12. FIG. 16 is a diagram for explaining a change in proportion between the transmission rates $RTO_{PEL}$ and $RTO_{PMC}$ generated by a difference in the capacity coefficient τ of the torque converter 16 corresponding to FIGS. 14 and 15 in the coordinate system same as FIG. 6.

In FIGS. 14, 15, and 16, a long dashed line L01 corresponds to the time of release of the brake Bs and a short dashed line L02 corresponds to the time of engagement of the brake Bs. Although the engine operating point is moved to the same target engine operating points P05 and P06 on the engine minimum fuel consumption rate line $L_{FL}$ through the engine operating point control, since the hydraulic characteristic of the torque converter 16 is different, the proportion between the transmission rates $RTO_{PEL}$ and $RTO_{PMC}$ is changed and the combined transmission efficiency $\eta_{CVT}$ is varied. In particular, since the transmission efficiency $\eta_{EL}$ of the electric path is higher than the transmission efficiency $\eta_{MC}$ of the mechanical path in the range of the speed ratio e at the engine operating points P05 and P06 in this case, when the capacity coefficient τ of the torque converter 16 is reduced and the pump torque Tp is lowered by the engagement of the brake Bs, the transmission rate $RTO_{PMC}$ of the mechanical path is made lower, i.e., the transmission rate $RTO_{PEL}$ of the electric path is made higher, and the combined transmission efficiency $\eta_{CVT}$ is improved in the case of the same target engine operating points P05 and P06.

Therefore, when controlling the operating point of the engine 12 to the same target engine operating point, if the combined transmission efficiency $\eta_{CVT}$ is improved, the electronic control device 40 controls the engagement operation of the brake Bs to change the capacity coefficient τ of the torque converter 16. Specifically, as apparent from FIG. 14, in a range of a relatively small speed ratio e, the transmission efficiency $\eta_{EL}$ of the electric path tends to be higher than the transmission efficiency $\eta_{MC}$ of the mechanical path and, contrarily, in a range of a relatively large speed ratio e, the transmission efficiency $\eta_{MC}$ of the mechanical path tends to be higher than the transmission efficiency $\eta_{EL}$ of the electric path. Therefore, even if the brake Bs is engaged to reduce the capacity coefficient τ of the torque converter 16, the combined transmission efficiency $\eta_{CVT}$ is not necessarily improved. Therefore, if the transmission efficiency $\tau_{EL}$ of the electric path is higher (better) than the transmission efficiency $\eta_{MC}$ of the mechanical path, the electronic control device 40 engages the brake Bs to reduce the capacity coefficient τ of the torque converter 16. On the other hand, if the transmission efficiency $\eta_{MC}$ of the mechanical path is higher (better) than the transmission efficiency $\eta_{EL}$ of the electric path, the electronic control device 40 releases the brake Bs to increase the capacity coefficient τ of the torque converter 16.

Figure 17:
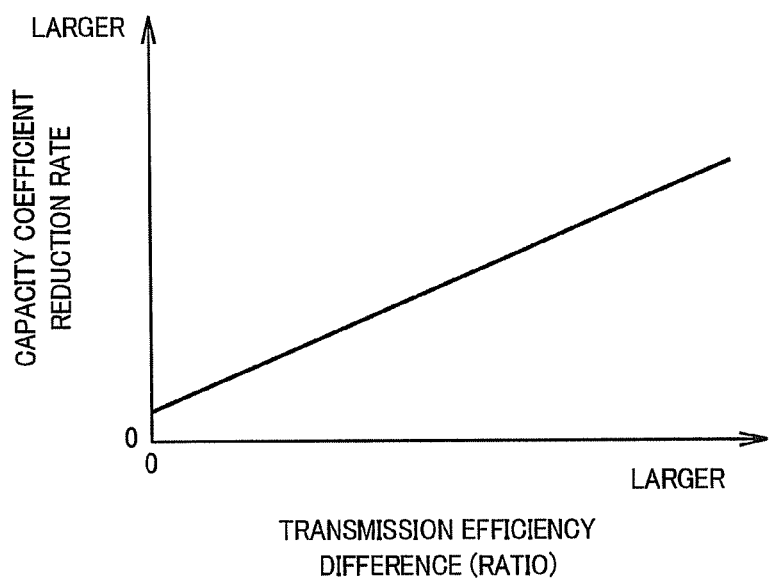
FIG. 17 is a diagram of a reduction rate of the capacity coefficient of the torque converter varied depending on a transmission efficiency difference or a transmission efficiency ratio.

As described above, the brake Bs can be slip-engaged and the capacity coefficient τ of the torque converter 16 can be set to a value between the time of engagement and the time of release of the brake Bs. Therefore, when the transmission efficiency $\eta_{EL}$ of the electric path is higher than the transmission efficiency $\eta_{MC}$ of the mechanical path, the torque capacity of the brake Bs may be made higher to reduce the capacity coefficient τ of the torque converter 16 so that the transmission rate $RTO_{PEL}$ of the electric path is increased. In other words, when a larger improving effect on the combined transmission efficiency $\eta_{CVT}$ is produced by increasing the transmission rate $RTO_{PEL}$ of the electric path, the power transmission may be replaced from the mechanical path to the electric path. FIG. 17 is a diagram of a reduction rate of the capacity coefficient τ of the torque converter 16 varied depending on a transmission efficiency difference Δη ($=\eta_{EL}-\eta_{MC}$) that is a difference between the transmission efficiency $\eta_{EL}$ of the electric path and the transmission efficiency $\eta_{MC}$ of the mechanical path or a transmission efficiency ratio ηratio ($\eta_{EL}/\eta_{MC}$) that is a ratio between the transmission efficiency $\eta_{EL}$ and the transmission efficiency $\eta_{MC}$. In FIG. 17, when the transmission efficiency difference Δη or the transmission efficiency ratio ηratio is larger, the brake Bs is changed toward the engagement side (i.e., the torque capacity of the brake Bs is made larger) to increase the reduction rate of the capacity coefficient τ of the torque converter 16.

If the capacity coefficient τ of the torque converter 16 is made smaller to increase the transmission rate $RTO_{PEL}$ of the electric path, the output of the first electric motor MG1 is accordingly increased. As a result, the increased output of the first electric motor MG1 may not be supported by the rated output of the first electric motor MG1. Particularly, if the brake Bs is engaged when a requested load (e.g., the requested output torque or the accelerator opening degree Acc) is high and the first electric motor MG1 is originally put into a high output state, the increased output of the first electric motor MG1 is more likely to be unsupportable. Therefore, if the requested load is equal to or less than a predetermined value set in advance as a range supportable by the power transmission through the electric path, the electronic control device 40 may allow a change toward a smaller capacity coefficient τ of the torque converter 16 through the engagement (or slip engagement) of the brake Bs.

More specifically, returning to FIG. 3, a running state determining portion, i.e., a running state determining means 72 determines whether the requested load is equal to or less than the predetermined value, based on, for example, whether the accelerator opening degree Acc is equal to or less than a predetermined opening degree Acc'. The predetermined opening degree Acc' is a low opening degree determining value obtained and stored in advance as the accelerator opening degree Acc within a range supportable by the first electric motor MG1 even if the power transmission through the electric path increases. The running state determining means 72 determines, for example, that a high load state associated with a request load exceeding the predetermined value is absent or that no shift to the high load state subsequently occurs, based on that the vehicle is not running on a climbing road. In this way, the running state determining means 72 determines whether low-load running is being performed.

The running state determining means 72 determines whether, for example, the transmission efficiency $\eta_{EL}$ of the electric path is higher than the transmission efficiency $\eta_{MC}$ of the mechanical path in the range. For example, as apparent from FIG. 14, the range with the transmission efficiency $\eta_{EL}$ of the electric path higher than the transmission efficiency $\eta_{MC}$ of the mechanical path is a range with a relatively small speed ratio e of the torque converter 16. This range with a relatively small speed ratio e is a range with the engine rotation speed Ne (having the same meaning as the pump rotation speed Np) is relatively higher than the turbine rotation speed Nt (e.g., a racing-up range) and leads to the assumption that the vehicle is at the time of starting, for example. Therefore, for example, based on whether the vehicle is at the time of starting, the running state determining means 72 determines whether the transmission efficiency $\eta_{EL}$ of the electric path is higher than the transmission efficiency $\eta_{MC}$ of the mechanical path in the range. The running state determining means 72 may determine whether the speed ratio e of the torque converter 16 is smaller than a predetermined speed ratio e', for example. This ratio e' is a low speed ratio upper limit value obtained and stored in advance for determining a low speed ratio range in which the transmission efficiency $\eta_{EL}$ of the electric path is higher than the transmission efficiency $\eta_{MC}$ of the mechanical path, for example.

For example, if the running state determining means 72 determines that the request load is equal to or less than the predetermined value and that the transmission efficiency $\tau_{EL}$ of the electric path is higher than the transmission efficiency $\eta_{MC}$ of the mechanical path in the range, a capacity variable control portion, i.e., a capacity variable control means 74 outputs an instruction signal for engaging (or slip-engaging) the brake Bs to reduce the capacity coefficient τ of the torque converter 16. On the other hand, for example, if the running state determining means 72 determines that the request load is greater than the predetermined value or that the transmission efficiency $\eta_{EL}$ of the electric path is lower than the transmission efficiency $\eta_{MC}$ of the mechanical path in the range, the capacity variable control means 74 outputs an instruction signal for releasing the brake Bs to increase the capacity coefficient τ of the torque converter 16.

Figure 18:
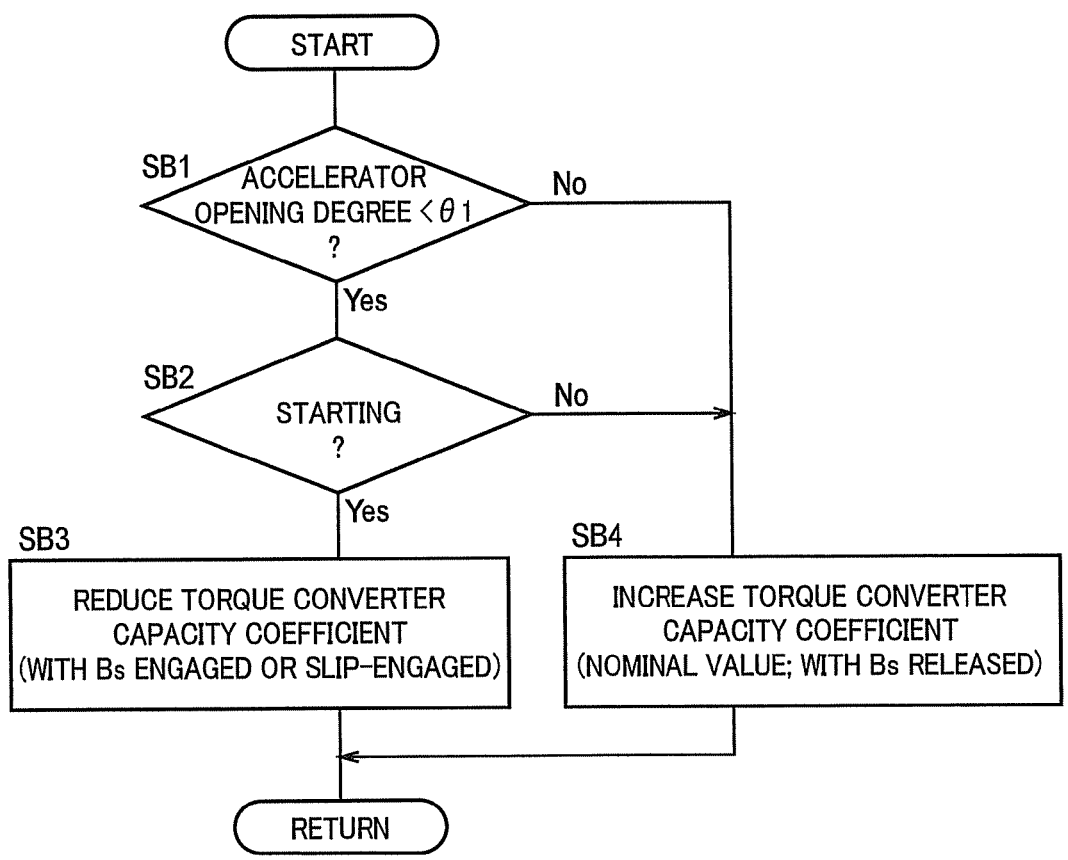
FIG. 18 is a flowchart for explaining a main portion of the control operation of the electronic control device in FIG. 3, i.e., the control operation achieving a further fuel efficiency improvement in a vehicle when the engine operating point is controlled by adjusting the first electric motor torque.

FIG. 18 is a flowchart for explaining a main portion of the control operation of the electronic control device 40, the control operation achieving a further fuel efficiency improvement in a vehicle when the engine operating point is controlled by adjusting the first electric motor torque $\eta_{MG1}$, and is repeatedly executed with an extremely short cycle time, for example, on the order of a few msec to a few tens of msec. The control operation depicted in FIG. 18 is performed solely or concurrently with another control operation. Steps (hereinafter, "step" will be omitted) SB1 and SB2 correspond to the running state determining means 72, and SB3 and SB4 correspond to the capacity variable control means 74.

First, at SB1, it is determined whether the requested load is equal to or less than the predetermined value. For example, it is determined whether the accelerator opening degree Acc is equal to or less than the predetermined opening degree Acc'. Alternatively, it is determined whether the vehicle is not running on a climbing road. In particular, it is determined whether a high load state is absent or no shift to the high load state subsequently occurs. If the determination of SB1 is affirmative, i.e., if a low load state is present, the operation goes to SB2. On the other hand, if the determination of SB1 is negative, i.e., if the high load state is present or if a shift to the high load state subsequently occurs, the operation goes to SB4.

At SB2, it is determined whether the transmission efficiency $\eta_{EL}$ of the electric path is higher than the transmission efficiency $\eta_{MC}$ of the mechanical path in the range. For example, it is determined whether the vehicle is at the time of starting. Alternatively, it is determined whether the speed ratio e of the torque converter 16 is smaller than the predetermined speed ratio e'. If the determination of SB2 is affirmative, i.e., if the vehicle is at the time of starting, the operation goes to SB3. On the other hand, if the determination of SB2 is negative, e.g., if the vehicle is not at the time of starting, the operation goes to SB4.

At SB3, the instruction signal for engaging (or slip-engaging) the brake Bs is output to reduce the capacity coefficient τ of the torque converter 16. As a result, the power transmission through the mechanical path is decreased and the power transmission through the electric path is accordingly increased. Since the transmission efficiency $\eta_{EL}$ of the electric path is higher than the transmission efficiency $\eta_{MC}$ of the mechanical path in the range, the combined transmission efficiency $\eta_{CVT}$ is improved.

At SB4, the instruction signal for releasing the brake Bs is output to increase the capacity coefficient τ of the torque converter 16. Alternatively, the capacity coefficient τ of the torque converter 16 is set to a normal value. As a result, since an increase in the power transmission through the electric path is avoided, the output of the first electric motor MG1 is prevented from being increased.

As described above, according to this example, since the vehicle drive device 10 includes the brake Bs controlling the rotating operation of the stator impeller 16s to change the capacity coefficient τ of the torque converter 16, a change can be made to the pump torque Tp uniquely determined based on the capacity coefficient τ of the torque converter 16 at the operating point of the engine 12 arbitrarily controlled by adjusting the first electric motor torque $T_{MG1}$. Therefore, at the operating point of the engine 12 in this case, a proportion between the transmission rate $RTO_{PMC}$ of the mechanical path and the transmission rate $RTO_{PEL}$ of the electric path can be changed to increase a proportion of the power transmission through the path with a better transmission rate $RTO_{PEL}$ or $RTO_{PMC}$ out of the mechanical path and the electric path. Therefore, when the engine operating point is controlled by adjusting the first electric motor torque $T_{MG1}$, further fuel efficiency improvement of the vehicle can be achieved.

According to this example, when the operating point of the engine 12 is controlled to the same target engine operating point, if the combined transmission efficiency $\eta_{CVT}$ is improved, the capacity coefficient τ of the torque converter 16 is changed by controlling the engagement operation of the brake Bs and, therefore, when the engine operating point is controlled by adjusting the first electric motor torque $T_{MG1}$, further fuel efficiency improvement of the vehicle can properly be achieved.

According to this example, if the requested load is equal to or less than the predetermined value, the capacity coefficient τ of the torque converter 16 is allowed to be changed smaller through the engagement (or slip engagement) of the brake Bs and, therefore, if the requested load is greater than the predetermined value, this avoids the possibility of reducing the pump torque Tp and increasing the first electric motor torque $T_{MG1}$ due to the change toward smaller capacity coefficient τ of the torque converter 16 and thus causing the state in which the increased torque cannot be output by the rated output of the first electric motor MG1.

According to this example, if the transmission efficiency $\eta_{EL}$ of the electric path is higher than the transmission efficiency $\eta_{MC}$ of the mechanical path, the brake Bs is engaged (or slip-engaged) to reduce the capacity coefficient τ of the torque converter 16 and, therefore, the pump torque Tp can be reduced to increase the first electric motor torque $T_{MG1}$, thereby increasing the proportion of power transmission through the electric path with the better transmission efficiency $\eta_{EL}$. Therefore, when the engine operating point is controlled by adjusting the first electric motor torque $T_{MG1}$, further fuel efficiency improvement of the vehicle can be achieved.

According to this example, if the transmission efficiency $\eta_{MC}$ of the mechanical path is higher than the transmission efficiency $\eta_{EL}$ of the electric path, the brake Bs is released to increase the capacity coefficient τ of the torque converter 16 and, therefore, the pump torque Tp can be increased to reduce the first electric motor torque $T_{MG1}$, thereby increasing the proportion of power transmission through the mechanical path with the better transmission efficiency $\eta_{MC}$. Therefore, when the engine operating point is controlled by adjusting the first electric motor torque $T_{MG1}$, further fuel efficiency improvement of the vehicle can be achieved.

Although an example of the present invention has been described in detail with reference to the drawings, the present invention is not limited to this example and may be implemented in other forms.

For example, although the automatic transmission 18 is a stepped transmission in the example, the automatic transmission 18 may be a continuously variable transmission (CVT) capable of continuously varying the gear ratio $\gamma_{AT}$.

Figure 19:
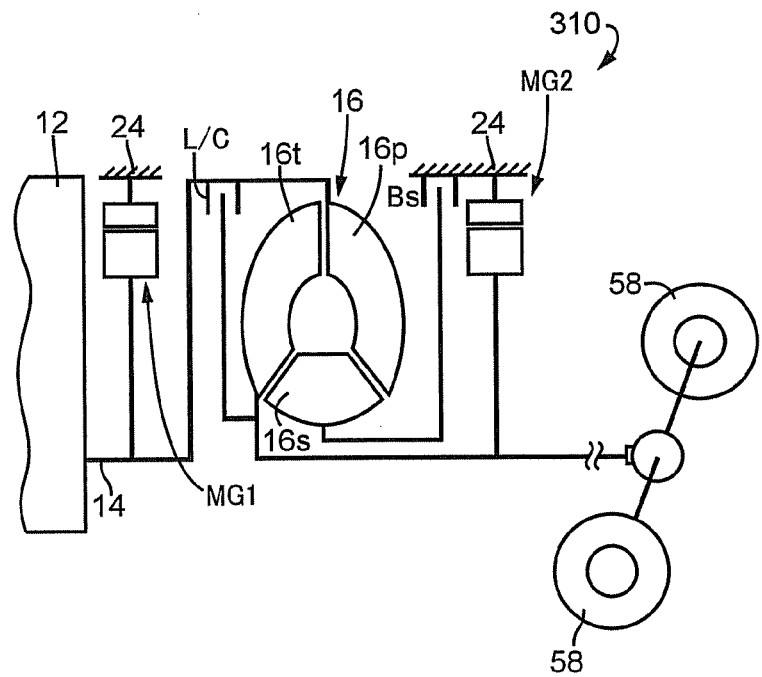
FIG. 19 is a schematic for explaining a configuration of a vehicle drive device without the automatic transmission and the schematic for explaining the configuration of the vehicle drive device different from that of FIG. 1.

Although the vehicle drive device 10 includes the automatic transmission 18 subjected to the automatic shift control in the example, a configuration without the automatic transmission 18 may be conceivable as in the case of a vehicle drive device 310 depicted in FIG. 19, for example.

Although the vehicle drive device 10 includes the brake Bs as a capacity variable device changing the capacity coefficient $\tau$ of the torque converter 16 by controlling the rotating operation of the stator impeller 16s of the torque converter 16, this is not necessarily a limitation. For example, the vehicle drive device 10 may include a third electric motor MG3 for rotationally driving the stator impeller 16s as the capacity variable device instead of, or in addition to, the brake Bs.

Figure 20:
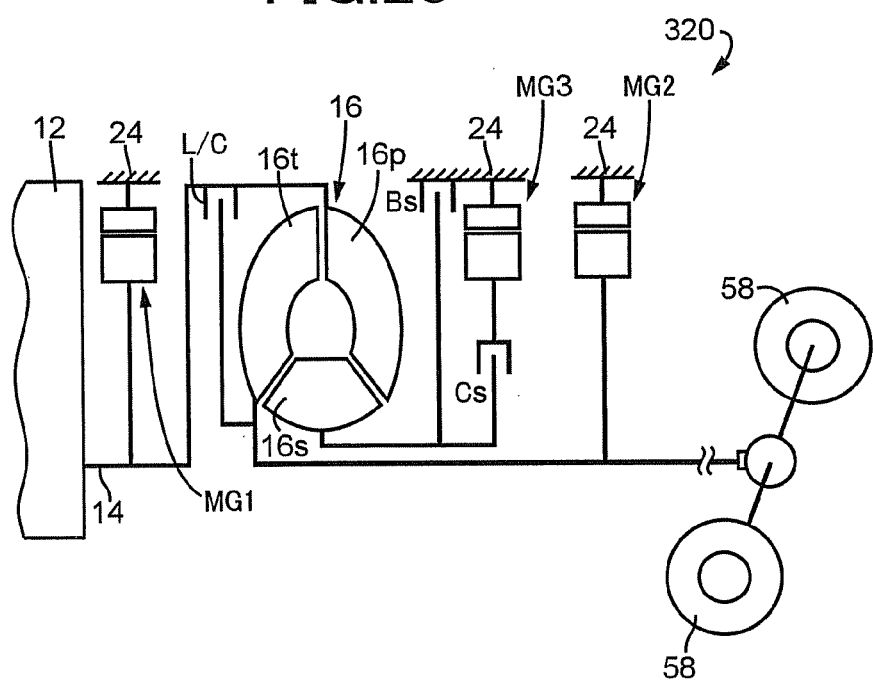
FIG. 20 is a schematic for explaining a configuration of a vehicle drive device further including the third electric motor as the capacity variable device in addition to the brake and the schematic for explaining the configuration of the vehicle drive device different from that of FIG. 1.
Figure 21:
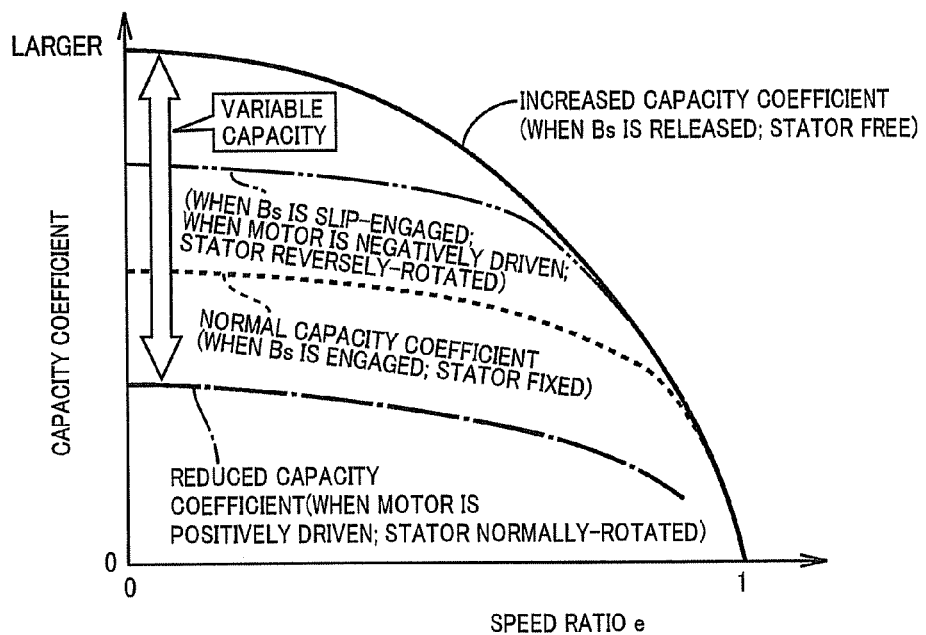
FIG. 21 is a diagram of a positive drive capacity coefficient of the torque converter changed by controlling the operation of the third electric motor in the same coordinate system as FIG. 13.

FIG. 20 is a schematic for explaining a configuration of a vehicle drive device 320 further including the third electric motor MG3 as the capacity variable device in addition to the brake Bs. In FIG. 20, the third electric motor MG3 is coupled via a clutch Cs to the stator impeller 16s of the torque converter 16. As is the case with the first electric motor MG1 etc., the third electric motor MG3 is made up of a motor generator and is connected to the electric storage device 36 such that electric power can mutually be given/received. The electronic control device 40 can control the rotation speed of the stator impeller 16s by controlling the operation of the third electric motor MG3 while the clutch Cs is engaged. As a result, the capacity coefficient $\tau$ of the torque converter 16 can be changed. FIG. 21 is a diagram of a positive drive capacity coefficient $\tau$ of the torque converter 16 changed by controlling the operation of the third electric motor MG3 in the same coordinate system as FIG. 13. In FIG. 21, a solid line indicates the capacity coefficient $\tau$ when the brake Bs and the clutch Cs are released; a broken line indicates the capacity coefficient $\tau$ when the clutch Cs is released and the brake Bs is engaged; a dashed-dotted line indicates the capacity coefficient $\tau$ when a stator normal rotation state is achieved in which the stator impeller 16s is rotated in the same rotation direction as the pump impeller 16p by the positive drive of the third electric motor MG3 while the clutch Cs is engaged and the brake Bs is released; and a dashed-two dotted line indicates the capacity coefficient $\tau$ when the clutch Cs is released and the brake Bs is slip-engaged. The state equivalent to that of the dashed-two dotted line can be produced by achieving a stator reverse rotation state in which the stator impeller 16s is rotated in the negative rotation direction opposite to the pump impeller 16p by the negative drive of the third electric motor MG3 while the clutch Cs is engaged and the brake Bs is released. By configuring the vehicle drive device 320 in this way, the capacity coefficient $\tau$ of the torque converter 16 can further be reduced and a capacity variable width is expanded as compared to the vehicle drive device 10. For example, the electronic control device 40 may achieve the stator fixed state indicated by the broken line during normal running such that when the engine operating point is controlled by adjusting the first electric motor torque $T_{MG1}$, if the transmission efficiency $\eta_{EL}$ of the electric path is higher than the transmission efficiency $\eta_{MC}$ of the mechanical path, the stator normal rotation state is achieved by positively driving the third electric motor MG3 so as to decrease the capacity coefficient $\tau$ of the torque converter 16, while if the transmission efficiency $\eta_{MC}$ of the mechanical path is higher than the transmission efficiency $\eta_{EL}$ of the electric path, the stator reverse rotation state or the stator free state is achieved by slip-engaging or releasing the brake Bs (or negatively driving the third electric motor MG3) so as to increase the capacity coefficient $\tau$ of the torque converter 16. As a result, as is the case with the example, when the engine operating point is controlled by adjusting the first electric motor torque $T_{MG1}$, further fuel efficiency improvement of the vehicle can be achieved. The vehicle drive device 320 may not include the brake Bs and the third electric motor MG3 may directly be coupled to the stator impeller 16s.

Although the torque converter 16 is used as a hydraulic power transmission device in the example, a fluid coupling (fluid coupling) without the stator impeller 16s playing a role in the torque amplification effect may be used instead of the torque converter 16. If the fluid coupling is used, a configuration of the capacity variable device changing a capacity by controlling the rotating operation of the stator impeller is not applicable; however, for example, the capacity of the fluid coupling can be changed by various capacity variable devices described below. For example, the capacity variable device has a configuration in which a pump impeller of the fluid coupling is divided into an inner circumferential side pump half body and an outer circumferential side pump half body relatively rotatable to the inner circumferential side pump half body while surrounding the inner circumferential side pump half body, and also includes a clutch coupling/interrupting the both pump half bodies such that the clutch is put into an interrupted state to halt one of the both pump half bodies and reduce the pump function by half, thereby decreasing the capacity of the fluid coupling, while the clutch is put into a coupled state to couple the both pump half bodies and allow the whole pump function to be exerted, thereby increasing the capacity of the fluid coupling. Alternatively, the capacity variable device has a configuration in which a turbine impeller has an opening portion formed in an outer circumferential portion thereof and communicating with the outside and the inside of the turbine impeller, and also includes an opening/closing mechanism opening/closing the opening portion such that the opening portion is opened by the opening/closing mechanism to discharge a portion of a fluid flow from the pump impeller to the outside of the turbine impeller, thereby decreasing the capacity of the fluid coupling, while the opening portion is closed by the opening/closing mechanism to prevent the discharge of the fluid flow to the outside of the turbine impeller, thereby increasing the capacity of the fluid coupling. The configurations of the capacity variable devices applicable to the fluid coupling as described above are obviously applicable to the torque converter 16.

Although the first electric motor MG1 is driven to perform regenerative operation and the first electric motor torque $T_{MG1}$ is generated in the negative rotation direction in the engine operating point control in the example, the power circulation state may be permitted such that the first electric motor MG1 consumes electric power while the second electric motor MG2 generates electricity, i.e., the first electric motor torque $T_{MG1}$ may be generated in the positive rotation direction in some cases.

In the example, the second electric motor MG2 is coupled to the input shaft 20 of the automatic transmission 18 as depicted in FIG. 1 and, therefore, the second electric motor MG2 is indirectly coupled via the automatic transmission 18 to the drive wheels 58; however, the second electric motor MG2 may be coupled to the output shaft 22 instead of the input shaft 20. If the second electric motor MG2 is coupled to the output shaft 22 in this way, the second electric motor MG2 and the drive wheels 58 rotate in one-to-one relationship without interruption of power transmission and, therefore, it can be said that the second electric motor MG2 is directly coupled to the drive wheels 58. The second electric motor MG2 may be a wheel-in motor built into the drive wheels 58. In this case, a total of the two second electric motors MG2 are disposed in the left and right drive wheels 58.

In the example, the second electric motor MG2 is coupled to the drive wheels 58 that are rear wheels indirectly coupled to the engine 12 as depicted in FIG. 1; however, the engine 12 and the first electric motor MG1 may be coupled to the rear wheels as depicted in FIG. 1 while the second electric motor MG2 may directly or indirectly be coupled to front wheels instead of the rear wheels. If the second electric motor MG2 is coupled to the front wheels in this way, the front wheels are included in drive wheels. In short, the drive wheels driven by the power from the engine 12 may be wheels different from the drive wheels driven by the power from the second electric motor MG2.

Although the first electric motor torque $T_{MG1}$ is adjusted in the engine operating point control, i.e., the continuously variable transmission operation of the continuously variable transmission 60 described in the example, the first electric motor torque $T_{MG1}$ may directly be adjusted or may be adjusted as a result of adjustment of the second electric motor torque $T_{MG2}$, i.e., adjustment of the output of the second electric motor MG2, or in other words, in an indirect manner.

In the example, the power transmission is electrically performed through the electric path by giving and receiving electric power between the first electric motor MG1 and the second electric motor MG2; however, for example, the electric power generated by the first electric motor MG1 may directly be supplied to the second electric motor MG2 without via the electric storage device 36, or the electric power generated by the first electric motor MG1 may indirectly be supplied to the second electric motor MG2 in such a manner that the electric power generated by the first electric motor MG1 is once stored in the electric storage device 36 and then supplied from the electric storage device 36 to the second electric motor MG2. The same applies to the time of the power circulation.

In the example, the power transmission is electrically performed through the electric path in the engine operating point control by giving and receiving electric power between the first electric motor MG1 and the second electric motor MG2; however, for example, the second electric motor MG2 may be driven by the supply of electric power from the electric storage device 36, or the supply of electric power from the electric storage device 36 along with the supply of electric power generated by the first electric motor MG1. The same applies to the electric power supply to the first electric motor MG1 in the case of power running of the first electric motor MG1 at the time of the power circulation.

Although the first electric motor MG1 is directly coupled to the pump impeller 16p of the torque converter 16 as depicted in FIG. 1 in the example, the first electric motor MG1 may indirectly be coupled to the pump impeller 16p via a transmission, a clutch, or an electric belt.

Although the vehicle drive device 10 includes the electric storage device 36 in the example, the electric storage device 36 may not be included.

Although SA3 is followed by SA4 in the flowchart of FIG. 10 in the example, either of these steps may come first and, for example, in the flowchart, after SA2 is followed by SA4, if the determination at SA4 is affirmative, the operation may go to SA3, and SA3 may be followed by SA5.

Although the engine rotation speed Ne indicated by the target engine operating point is increased by the predetermined change amount ΔNe to determine a new target engine operating point at SA5 of the flowchart of FIG. 10 in the example, the engine rotation speed Ne may be decreased by the predetermined change amount ΔNe to determine a new target engine operating point. In such a case, at SA9 of FIG. 10, the engine rotation speed Ne indicated by the current target engine operating point determined at SA5 is increased by the predetermined change amount ΔNe to determine a new target engine operating point.

With regard to the flowchart depicted in FIG. 10 of the example, it is conceivable that the flowchart may not include steps SA3 to SA10 so that SA11 is executed after SA2.

Although the target engine operating point is set on the engine minimum fuel consumption rate line $L_{FL}$ as indicated by, for example, the point P05 in FIG. 9 in the example, it is conceivable that the target engine operating point is set out of the engine minimum fuel consumption rate line $L_{FL}$.

Although the vehicle can perform the motor running in the example, the vehicle may always run by performing the engine running.

Although the torque converter 16 includes the lockup clutch L/C in the example, the lockup clutch L/C is released in the continuously variable transmission operation of the continuously variable transmission 60 and, therefore, the lockup clutch L/C may not be included.

Although the automatic transmission 18 is shifted to Rev1 or Rev2 depicted in FIG. 2 and the input shaft 20 of the automatic transmission 18 is rotated in the positive rotation direction when the vehicle is caused to run backward in the example, the vehicle may be caused to run backward by shifting the automatic transmission 18 to any one of 1st to 8th depicted in FIG. 2 and driving the second electric motor MG2 in the negative rotation direction.

In the example, the vehicle drive devices 10, 310, and 320 are not limited to those used in FR (front-engine rear-drive) type vehicles and may be those used in vehicles of other drive types.

Although the transmission rates $RTO_{PEL}$ and $RTO_{PMC}$ of the electric path and the mechanical path are not changed stepwise as depicted in FIG. 6 in the continuously variable transmission operation of the continuously variable transmission 60 in the example, since the transmission efficiency $\eta_{EL}$ of the electric path is higher than the transmission efficiency $\eta_{MC}$ of the mechanical path in the lower speed ratio range relative to the speed ratio indicated by the intersection point between the dashed-dotted line and the solid line as depicted in FIG. 8 while the transmission efficiency $\eta_{MC}$ of the mechanical path is higher than the transmission efficiency $\eta_{EL}$ of the electric path in the higher speed ratio range, for example, the power transmission may be performed through only the electric path in the lower speed ratio range and the power transmission may be performed through only the mechanical path in the higher speed ratio range.

In the example, if the operation mode determining means 68 determines that the system optimum operation mode is selected, the engine operating point control means 70 shifts the operating point of the engine 12 to the side of greater total efficiency $\eta_{TOTAL}$; however, instead of the total efficiency $\eta_{TOTAL}$, the operating point of the engine 12 may be shifted based on a total loss $LSS_{TOTAL}$ acquired by summing a power transmission loss $LSS_{CVT}$ when the power from the engine 12 is transmitted through the electric path and the mechanical path and a loss $LSS_{ENG}$ of the engine 12 (hereinafter referred to as an engine loss $LSS_{ENG}$). Specifically, the operating point of the engine 12 may be shifted to the side of a smaller total loss $LSS_{TOTAL}$. In this case, as compared to the case that the operating point of the engine 12 is not changed depending on the total loss $LSS_{TOTAL}$, the efficiency of the vehicle drive device 10 is increased as a whole, i.e., the total loss $LSS_{TOTAL}$ is reduced, and the vehicle fuel efficiency can be improved.

The power transmission loss $LSS_{CVT}$ can be calculated based on the power input to the continuously variable transmission 60, i.e., the engine output Pe, and the combined transmission efficiency $\eta_{CVT}$, and the engine loss $LSS_{ENG}$ can be calculated based on a complete combustion engine output $Pe_{CMP}$ that is a lower heating value per unit time when the fuel supplied to the engine 12 is completely combusted, and the engine efficiency $\eta_{ENG}$.

Figure 22:
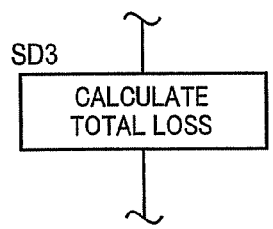
FIG. 22 is a diagram of a step replaced from SA 3 of FIG. 10 to explain a flow chart different form a flowchart in FIG. 10.
Figure 23:
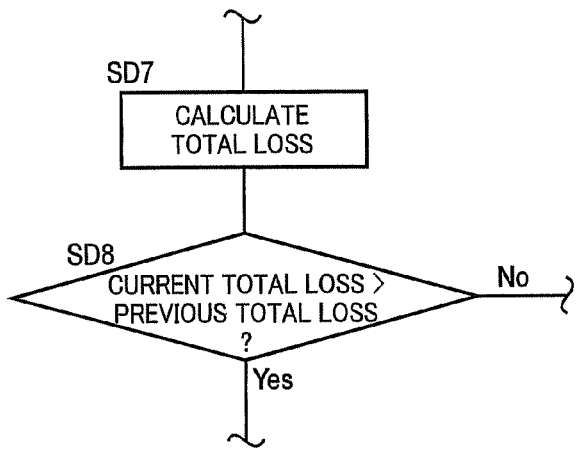
FIG. 23 is a diagram of a step replaced from SA 7, SA 8 of FIG. 10 in the flowchart explained in FIG. 22.

If the operating point of the engine 12 is skilled to the side of a smaller total loss $LSS_{TOTAL}$ as described above, in the flowchart of FIG. 10, SA3 is replaced with SD3 of FIG. 22, and SA7 and SA8 are replaced with SD7 and SD8 of FIG. 23. SD3, SD7, and SD8 correspond to the engine operating point control means 70.

Specifically describing the flowchart having SD3, SD7, and SD8 in place of SA3, SA7, and SA8 of FIG. 10, in the flowchart, SA2 of FIG. 10 is followed by SD3 of FIG. 22, and SD3 is followed by SA4 of FIG. 10. At SD3, as is the case with SA3, the combined transmission efficiency $\eta_{CVT}$ and the engine efficiency $\eta_{ENG}$ are calculated. Fuel consumption in the engine 12 is sequentially detected over time and the complete combustion engine output $Pe_{CMP}$ is calculated based on the fuel consumption per unit time. Relationship between the complete combustion engine output $Pe_{CMP}$ and the fuel consumption per unit time is empirically obtained in advance, for example. The total loss $LSS_{TOTAL}$ is then calculated based on the calculated combined transmission efficiency $\eta_{CVT}$, the engine efficiency $\eta_{ENG}$, and the complete combustion engine output $Pe_{CMP}$.

SA6 of FIG. 10 is followed by SD7 of FIG. 23. At SD7, as is the case with the SD3, the total loss $LSS_{TOTAL}$ based on the current target engine operating point (referred to as a current total loss) is calculated. A previous total loss, i.e., the total loss $LSS_{TOTAL}$ based on the previous target engine operating point, is stored in advance for determination at SD8 of FIG. 23. SD7 is followed by SD8.

At SD8, it is determined whether the previous total loss is smaller than the current total loss. If the determination at SD8 is affirmative, i.e., if the previous total loss is smaller than the current total loss, the operation goes to SA9 of FIG. 10. On the other hand, if the determination at SD8 is negative, the operation goes to SA5 of FIG. 10. Although the replacement of SA3, SA7, and SA8 with SD3, SD7, and SD8 in the flowchart of FIG. 10 makes differences described above, the other points are the same as the flowchart of FIG. 10.

In the example, at the time of changing the capacity coefficient τ of the torque converter 16 when the operating point of the engine 12 is controlled to the same target engine operating point, the target engine operating point is determined such that the target engine output Pe* is achieved on the engine minimum fuel consumption rate line $L_{FL}$; however, the target engine operating point may be determined when the system optimum operation mode is selected.

The above description is merely an embodiment and, although not exemplarily illustrated one by one, the present invention may be implemented in variously modified and improved forms based on the knowledge of those skilled in the art without departing from the spirit thereof.

NOMENCLATURE OF ELEMENTS 10, 310, 320: vehicle drive device 12: engine 16: torque converter (hydraulic power transmission device) 16p: pump impeller (input-side rotating element) 16t: turbine impeller (output-side rotating element) 40: electronic control device (control device) 58: drive wheel Bs: brake (capacity variable device) MG1: first electric motor MG2: second electric motor MG3: third electric motor (capacity variable device)

The invention claimed is:

1. A control device of a vehicle drive device comprising: a hydraulic power transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels,
the vehicle drive device further comprising an electric path through which power is electrically transmitted by giving/receiving electric power between the first electric motor and the second electric motor and a mechanical path through which power is mechanically transmitted via the hydraulic power transmission device, the control device of the vehicle drive device being configured to control an operating point of the engine by adjusting a torque of the first electric motor,
the control device adjusting the torque of the first electric motor such that a sum of an engine torque and the torque of the first electric motor is balanced with an input-side load torque generated in the input-side rotating element depending on a speed ratio of the hydraulic power transmission device when the operating point of the engine is controlled,
the control device calculating the input-side load torque based on engine rotation speed indicated by the target engine operating point and determining the torque of the first electric motor based on the engine torque indicated by the target engine operating point and the input-side load torque,
the vehicle drive device further comprising a capacity variable device varying a characteristic of a capacity coefficient of the hydraulic power transmission device relative to a speed ratio of the hydraulic power transmission device that is a hydraulic characteristic of the hydraulic power transmission device for determining the input-side load torque.

2. The control device of the vehicle drive device of claim 1, wherein when the operating point of the engine is controlled to the same target operating point, if power transmission efficiency is improved at the time of transmission of power from the engine through the electric path and the mechanical path, the capacity variable device changes the capacity of the hydraulic power transmission device.

3. The control device of the vehicle drive device of claim 1, wherein if a requested load is equal to or less than a predetermined value set in advance such that the requested load is supportable by power transmission through the electric path in a range in which the requested load is equal to or less than the predetermined value, the capacity variable device is allowed to make a change toward a smaller capacity of the hydraulic power transmission device.

4. The control device of the vehicle drive device of claim 1, wherein if a transmission efficiency through the electric path is better than a transmission efficiency through the mechanical path, the capacity variable device decreases the capacity of the hydraulic power transmission device.

5. The control device of the vehicle drive device of claim 1, wherein if the transmission efficiency through the mechanical path is better than a transmission efficiency through the electric path, the capacity variable device increases the capacity of the hydraulic power transmission device.

6. The control device of the vehicle drive device of claim 1, wherein the operating point of the engine is controlled by adjusting the torque of the first electric motor such that the operating point of the engine is located along a predetermined operation curve of the engine and that a target value of engine output is achieved.

7. The control device of the vehicle drive device of claim 1, wherein the operating point of the engine is shifted to a side of greater total efficiency represented by a product of a power transmission efficiency when power from the engine is transmitted through the electric path and the mechanical path and an engine efficiency at the operating point of the engine.

* * * * *

UNITED STATES PATENT AND TRADEMARK OFFICE
CERTIFICATE OF CORRECTION

PATENT NO. : 8,795,132 B2  
APPLICATION NO. : 14/129450  
DATED : August 5, 2014  
INVENTOR(S) : Atsushi Tabata et al.

Page 1 of 1

It is certified that error appears in the above-identified patent and that said Letters Patent is hereby corrected as shown below:

In the Specification

Column 6, line 2, please change "different form a" to --different from a--.

Column 14, line 11, please change "$\eta^{TOTAL}$" to --$\eta_{TOTAL}$--.

Column 15, line 35, please change "at SAL In other" to --at SA1. In other--.

Column 16, line 44, please change "$\eta_{MGI}$" to --$T_{MGI}$--.

Signed and Sealed this  
Twenty-eighth Day of April, 2015

Michelle K. Lee  
*Director of the United States Patent and Trademark Office*